(12) United States Patent
Satran et al.

(10) Patent No.: US 6,668,304 B1
(45) Date of Patent: Dec. 23, 2003

(54) TRANSACTION SUPPORT ON LOGICAL DISKS

(75) Inventors: Julian Satran, Atlit (IL); Israel Gold, Haifa (IL); Dafna Sheinwald, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 09/651,910

(22) Filed: Aug. 30, 2000

Related U.S. Application Data
(60) Provisional application No. 60/176,507, filed on Jan. 18, 2000.

(51) Int. Cl.[7] .............................................. G06F 12/00
(52) U.S. Cl. ........................ 711/112; 711/111; 711/114; 709/231; 709/238
(58) Field of Search ........................ 711/111, 112, 113, 711/114; 709/231, 232, 238

(56) References Cited

U.S. PATENT DOCUMENTS

| | | | | |
|---|---|---|---|---|
| 5,345,575 | A | | 9/1994 | English et al. ............... 711/112 |
| 5,481,694 | A | | 1/1996 | Chao et al. .................. 711/112 |
| 5,548,751 | A | * | 8/1996 | Ryu et al. .................... 707/102 |
| 6,038,636 | A | * | 3/2000 | Brown et al. ............... 711/103 |
| 6,049,802 | A | * | 4/2000 | Waggener et al. .......... 707/100 |
| 6,295,575 | B1 | * | 9/2001 | Blumenau et al. ............. 711/5 |
| 6,330,640 | B1 | * | 12/2001 | Williams et al. ............ 711/112 |
| 6,415,328 | B1 | * | 7/2002 | Korst ........................ 709/232 |

OTHER PUBLICATIONS de Jone, "Logical Disk: A Simple New Approach to Improving File System Performance", © 1993 Massachusetts Institute of Technology, p. 1–12.*

Bernstein, P. et al., *Concurrency Control and Recovery in Database Systems*, Addison–Wesley Publishing, Chapter 7: "Distributed Recovery", pp. 217–234, 1987, USA.

De Jonge et al., *The Logical Disk: A New Approach to Improving File Systems*, Proceedings of the 14th Symposium on Operating Systems Principles, pp. 15–28, Dec. 1993.

Chao et al., *Mime, a High Performance Parallel Storage Device with Strong Recovery Guarantees*, HPL–CSP–92–9 rev 1, Nov. 1992, pp. 1–18.

English et al., *Loge: a Self–Organizing Disk Controller*, Proceedings of the USENIX Winter 1992 Technical Conference, pp. 237–251, Jan. 1992, San Francisco.

* cited by examiner

*Primary Examiner*—Donald Sparks
*Assistant Examiner*—Brian R. Peugh
(74) *Attorney, Agent, or Firm*—Darby & Darby

(57) ABSTRACT

Apparatus for performing a data transaction, including at least one storage device which is adapted to receive data as a succession of data blocks for storage at respective physical locations therein and control circuitry. The control circuitry is configured to convey the succession of data blocks to the at least one storage device while writing to the at least one storage device, together with at least some of the data blocks, parameters indicative of the identity of the data transaction, the identity of the recorder of the transaction state, and a location of a subsequent data block in the succession. The control circuitry is also configured to transform a state of the data so as to complete (commit or abort) the data transaction using some of the indicative parameters. In the event of a failure of the apparatus before a transaction is completed, i.e., committed or aborted, the apparatus facilitates complete recovery using data stored in the data blocks.

68 Claims, 14 Drawing Sheets

TRANSACTION SUPPORT ON LOGICAL DISKS

CROSS-REFERENCE TO RELATED APPLICATIONS

This application claims the benefit of U.S. Provisional Patent Application 60/176,507, filed Jan. 18, 2000, which is incorporated herein by reference. This application is related to a U.S. patent application Ser. No. 09/611,062 entitled "Enhanced Stable Disk Storage," filed Jul. 6 2000, which is assigned to the assignee of the present application, and whose disclosure is incorporated herein by reference.

FIELD OF THE INVENTION

The present invention relates generally to data transactions, and specifically to distributed transaction support of data written to a non-volatile memory.

BACKGROUND OF THE INVENTION

A transaction is a sequence of information exchange and related work (such as database updating) that is treated as a unit of atomicity for ensuring data integrity. In a transaction, data is transformed from one consistent state to another. For a transaction to be completed and data changes to be made permanent (or "committed"), a transaction has to be made atomic with respect to failure, i.e., it has to be completed in its entirety. If something happens before the transaction is successfully completed, the transaction is aborted, and any changes to the data must be undone, so that the effect is as if the transaction never existed. Hereinbelow, the term "complete" when applied to a transaction meansi that the transaction is either committed or aborted.

The inherent difficulty of transaction support is exacerbated when participants in the transaction are part of a distributed system. It is then necessary to ensure that the transaction is committed or that it is aborted atomically and consistently by all of the participants. For example, some of the participants in a transaction may fail, and it is possible in a distributed system that some of the other participants may not know of the failure. Also, participants who have recovered after a failure must determine;the fate of the transaction.

In Concurrency Control and Recovery in Database Systems, by Bernstein et al. (Addison-Wesley, 1987), which is incorporated herein by reference, a description is given in chapter 7 of atomic commitment protocols (ACPs) which ensure transaction consistency over multiple sites of a distributed system. The authors describe a two-phase-commit (2PC) protocol as an example of an ACP. The 2PC protocol comprises a first phase wherein all participants of a transaction are polled as to whether the transaction should be committed or aborted. In a second phase of the 2PC protocol a coordinator of the transaction decides, on the basis of the poll, if the transaction is to be committed or aborted, and transmits that decision to the participants.

Methods for efficiently storing data, and recovering the stored data in the event of a computer system failure, are known in the art. The methods rely on storing information additional to the data to a non-volatile memory, typically a disk, and using the additional information to recover the stored data when the failure occurs.

U.S. Pat. No. 5,345,575 to English et al., whose disclosure is incorporated herein by reference, describes a disk controller comprising a memory. The memory contains a table mapping logical addresses of data blocks stored on a disk to labels identifying physical storage locations. In addition, to writing the data to a storage location, the disk controller writes the associated logical address of each storage location, a time stamp, and data indicating where in a sequence of data blocks a specific data block occurs. The additional information is used to recover from system failures by reading from substantially the whole disk.

U.S. Pat. No. 5,481,694 to Chao et al., whose disclosure is incorporated herein by reference, describes an electronic data storage system comprising a memory, a plurality of magnetic disk units, and a controller. The memory comprises a table cross-referencing logical addresses with physical addresses on the disk units, a list of physical addresses containing obsolete data, and a list of physical addresses for segments on the disk units which are able to receive data. When data are written to the disk units, a tag comprising the logical address and a sequence number for multiblock writes is written with the data. To recover from a system failure, a checkpoint log and checkpoint segments stored on the disk units recover the table and lists.

In an article by de Jonge et al., "The Logical Disk: A New Approach to Improving File Systems," in Proceedings of the 14th *Symposium on Operating Systems Principles*, pp. 15–28 (December 1993), which is incorporated herein by reference, the authors describe a logical disk wherein an interface is defined for disk storage which separates file management and disk management. The interface uses logical block numbers and block lists, and supports multiple file systems. The authors claim to support an Atomic Recovery Unit (ARU). During recovery all logical disk commands belonging to the same ARU are treated as a single invisible operation. Thus, the logical disk will always recover to either a state that existed before, or to a state that existed after performing all operations of an ARU. However, concurrent ARUs are not supported.

In an article by English et al., "Loge: a self-organizing disk controller," in Proceedings of the USENIX Winter 1992 Technical Conference, pp. 237–251 (January 1992), which is incorporated herein by reference, the authors describe a system for storing data to a disk using a translation table and an allocation map. A trailer tag comprising a block address and a time stamp is written to the disk together with the stored data. The information in the trailer tag enables the system to recover from a failure.

In an article by Chao et al., "Mime: a high performance parallel storage device with strong recovery guarantees," HPL-CSP-92-9 (published by the Hewlett-Packard Company, November 1992), which is incorporated herein by reference, the authors describe a disk storage architecture similar to that of Loge, as described above. In Mime, the trailer tag comprises a block address, a sequence number for multiblock writes, and a last-packet-in-multiblock-write flag. As in Loge, the trailer tag information enables the system to recover from a failure.

Mime supports atomic multi-block writes with a limited form of transaction support in the form of a visibility group. Mime guarantees that in the case of a failure all block writes within an active visibility group are aborted.

SUMMARY OF THE INVENTION

It is an object of some aspects of the present invention to provide an improved system for supporting data transactions.

It is a further object of some aspects of the present invention to; provide an improved system for performing concurrent data transactions when participants in the transaction are distributed over a network.

In preferred embodiments of the present invention, one or more storage devices, preferably non-volatile disks, are used for storing data contents of transactions initiated by one or more clients of the storage devices. Each of the storage devices is managed by control circuitry, preferably a storage server, which writes the data contents of the transactions to selected block-frames of the storage device. Such storage devices are herein termed transaction supporting logical disks (TSLDS). The storage servers have volatile memory in which they hold data structures whose values are used, inter alia, to track transaction data written to the TSLDs and to link dynamically the physical and logical addresses of the block-frames to which the data are written.

In order to safeguard a TSLD against failure of a specific storage server, values in the data structures of the server are stored to that TSLD at periodic intervals, using checkpoint operations. Between checkpoint operations, values in the data structures are also stored together with the data contents of the transactions in the block-frames of each TSLD. Preferably, values in the data structures, and the checkpoint data, enable block-frames to be conveniently found in the event of a storage server failure, so that the data contents within the block-frames can be recovered. In the event of a failure, the storage server reads the stored checkpoint data and "replays" the process of TSLD operations, including committing and aborting transactions, since the last checkpoint was performed. The replaying process enables the storage server to recover its state and the state of any ongoing transactions at the time of failure. Alternative methods ;of storage and of recovery are described in the above-mentioned provisional patent application and in another patent application entitled "Enhanced Stable Disk Storage," filed Jul. 6, 2000, which is assigned to the assignee of the present application, and whose disclosure is incorporated herein by reference.

Preferred embodiments of the present invention preferably support a two-phase-commit (2PC) protocol, as described generally in the Background of the Invention. In a first phase 6f a transaction, a specific TSLD client, called the transaction coordinator, initiates the transaction by designating one of the TSLDs participating in the transaction to be a primary TSLD. The primary TSLD acts as a recorder by tracking the state of the transaction, and the client instructs the primary TSLD to begin the transaction. The client instructs the other TSLDs participating in the transaction, via their managing servers, to "soft-write" appropriate data contents of the transaction to the respective TSLDs, thus generating non-commltted block values, and to inform the client in each case that this has been done. In a soft-write operation the logical and physical addresses of block-frames written to are provisionally linked. Once the client knows that the first phase has been successfully accomplished, in a second phase it instructs the primary TSLD to commit the transaction and then the client issues commit instructions to each of the participating TSLDs to commit the transaction, thus generating committed block values. Commit operations are performed by permanently linking the provisionally linked addresses. If the first phase is not successfully completed within a predetermined time period, the client instructs the primary TSLD to abort the transaction, and then the client issues abort instructions to each of the participating TSLDs to abort the transaction, whereupon the address linkage existing before the transaction is reinstated.

The system described above has a number of significant advantages in transaction operations over systems for transactions known in the art. Specifically:

The same information in the data structures is used to enable a TSLD to recover substantially completely from server failure, and to allow an efficient implementation of a two-phase-commit protocol.

The system supports a distributed transaction over multiple TSLDs, and also supports concurrent data transactions on one or more TSLDs.

There is no central log of transaction states. Each transaction may select a different primary TSLD, and thus transaction state logging is distributed.

A TSLD supports concurrent active transactions and can recover from multiple transaction failures.

Because all the information in the data structures is stored to a TSLD, TSLDs are movable from a failed server to a working server, and are then able to regenerate address linkages and information about open transactions.

The incremental storage of data structure information to a TSLD is performed with no extra input/output operations to the TSLD.

Soft-write operations, together with committing and aborting of transactions, are supported even when the system comprises a plurality of disks and/or a plurality of servers distributed over a network.

Checkpoint operations may be implemented in a flexible manner, for example as a background operation or by identifying components in the data structures which have changed since the last checkpoint.

Recovery of a TSLD after a failure is fast, since only block-frames stored since the last checkpoint operation of this TSLD need to be read.

Recovery of la TSLD after a failure generates sufficient information about open transactions to enable the participants of the transaction to query the transaction state and achieve consensus whether to commit or abort the transaction. In the case of failure of a client, there is sufficient information on the TSLDs to commit or abort the transaction, which information may be acted on by other clients.

There is therefore provided, according to a preferred embodiment of the present invention, apparatus for supporting a data transaction, including:

at least one TSLD which is adapted to receive data as a succession of data blocks for storage at respective physical locations therein; and control circuitry, which is configured to convey the succession of data blocks to the at least one TSLD while writing to the at least one TSLD, together with at least some of the data blocks, at least one parameter indicative of a physical location of a subsequent data block in the succession, and to transform a state of the data so as to complete the data transaction using the at least one parameter.

Preferably, the control circuitry includes at least one communication link which couples the control circuitry to the at least one TSLD, and the control circuitry manages the at least one TSLD via the at least one link.

Preferably, the apparatus includes a data transmission network which conveys the data to the control circuitry and which is coupled thereto.

Further preferably, the data transmission network is coupled to and conveys the data to the at least one TSLD, and the control circuitry manages the at least one TSLD via the data transmission network.

Preferably, the apparatus includes a client which conveys the data to the control circuitry.

Preferably, the control circuitry includes at least one volatile memory which is adapted to store one or more data structures containing data indicative of one or more properties of at least some of the data blocks, at least some of which data are written by the control circuitry to the at least one TSLD, so that the contents of the at least one volatile memory can be regenerated from the at least some of the data, in the one or more data structures that are stored in the at least one TSLD.

Further preferably, one of the data structures includes a translation table which maps logical block addresses of the succession of data blocks to respective physical addresses and which tags which of the data blocks is currently engaged in an open data transaction.

Preferably, one of the data structures includes an auxiliary translation table which for each respective open data transaction maps logical block addresses associated with an open transaction to respective physical addresses of the succession of data blocks existing prior to initiation of the data transaction and to an identity of the open data transaction.

Preferably, the control circuitry writes the respective logical block addresses to the succession of data blocks.

Preferably, the control circuitry writes an identity of a data transaction to the succession of data blocks.

Preferably, the control circuitry writes an identity of a recorder of a state of a data transaction to the succession of data blocks.

Preferably, one of the data structures includes an allocation bitmap which maps an availability of each of the succession of data blocks.

Further preferably, one of the data structures includes a pointer value to the location of a next available data block in the succession.

Preferably, one of the data structures includes a pointer value to the location of a first available block in the succession.

Preferably, the at least one TSLD includes a disk having a disk head, and the control circuitry writes the data blocks to the disk in a series of passes of the disk head over a surface of the disk in a single direction.

Further preferably, each of the series of passes has a checkpoint-number, and one of the data structures includes a value indicative of the current checkpoint-number.

Preferably, one of the data structures includes a working allocation bitmap copy which stores an availability of each of the successive data blocks at the conclusion of one or more passes of the disk head.

Preferably, the control circuitry writes the at least some of the data in the one or more data structures to the at least one TSLD at the conclusion of one or more of the passes of the disk head.

Preferably, one of the data structures includes a transaction state log which is adapted to store at least one record of the data transaction, wherein the at least one record includes an identity of the data transaction and an identity of the at least one TSLD participating in the data transaction, and wherein the at least one record includes at least one of a group of records consisting of: begin-transaction, commit-transaction, and abort-transaction, which respectively record that the transaction has begun, is committed, and is aborted.

Preferably, the control circuitry writes a trailer to the succession of data blocks, the trailer including one or more data fields indicative of a use of each of the data blocks.

Preferably, the one or more data fields include an identity of the data transaction and an identity of a primary TSLD which acts as a recorder of the data transaction state.

Preferably, the one or more data fields include a logical address of the data block.

Preferably, the one or more data fields include a tag indicative of a state of the data transaction.

Preferably, the apparatus includes a disk controller which controls the at least one TSLD, wherein the disk controller is able to recover contents of a volatile memory from data written by the control circuitry to the at least one TSLD.

Preferably, the at least one parameter includes a plurality of parameters.

Preferably, the data transaction comprises a plurality of concurrent data transactions.

Preferably, the at least one TSLD comprises a disk managed by a server.

Preferably, the at least one TSLD comprises a plurality of TSLDs. Preferably, the at least one parameter includes a transaction state log which records one or more states of the data transaction.

Preferably, at least one parameter includes at least a part of a distributed transaction state log which records one or more states of the data transaction.

Preferably, the at least one storage device is adapted to be movable so as to be operative by other control circuitry, in order to recover information stored on the at least one storage device.

There is further provided, according to a preferred embodiment of the present invention, a method for performing a data transaction, including:

receiving data in at least one TSLD as a succession of data blocks, and, together with each of at least some of the data blocks, at least one parameter indicative of a physical location of a subsequent data block in the succession; and transforming a state of the data in the at least one TSLD, responsive to the at least one parameter, so as to complete the data transaction.

Preferably, the at least one parameter includes a plurality of parameters.

Preferably, receiving data in the at least one TSLD includes conveying the data to the at least one TSLD via a data transmission network.

Preferably, conveying the data inlcudes coupling the at least one TSLD to the data transmission network.

Preferably, conveying the data includes:

coupling the at least one TSLD to the data transmission network via control circuitry; and coupling the control circuitry to the data transmission network.

Further preferably, receiving the data includes receiving data from; a client.

Preferably, the method includes storing in at least one volatile memory one or more data structures containing data indicative of one or more properties of at least some of the data blocks, and writing at least some of the data that are in the data structures to the at least one TSLD, so that the contents of the at least one volatile memory can be regenerated from the at least some of the data in the one or more data structures that are stored in the at least one TSLD.

Preferably, storing the one or more data structures includes storing a translation table which maps logical block addresses of the succession of data blocks to respective physical addresses and which tags which of the data blocks is currently engaged in an open data transaction.

Preferably, storing the one or more data structures includes storing an auxiliary translation table which for each respective open data transaction maps logical block addresses associated with an open transaction to respective physical addresses of the succession of data blocks existing prior to initiation of the data transaction and to an identity of the open data transaction.

Preferably, receiving the data includes writing the respective logical addresses to the succession of data blocks.

Preferably, the method includes using the translation table to locate a specific data block, so as to read data from the specific data block. Preferably, storing the one or more data structures includes storing an allocation bitmap which indicates an availability of each of the successive locations.

Further preferably, writing the at least some of the data to the at least one TSLD includes writing data to one of the succession of data blocks using the steps of:
  scanning the one or more data structures to determine a physical location of an available data block in the at least one TSLD;
  writing the data and at least some contents of the one or more data structures into the physical location; and
  updating the one or more data structures responsive to the determined physical location.

Preferably, scanning the one or more data structures includes checking if a logical block address is involved in an open transaction.

Preferably, writing the data and at least some contents of the one or more data structures includes the steps of:
  writing a value corresponding to a soft-write operation; and
  writing an identity of one of the at least one TSLD as a primary TSLD, which acts as a recorder of the data transaction, so as to perform a temporary write operation.

Preferably, writing the data and at least some contents of the one or more data structures includes writing a value corresponding to a begin operation, and updating the one or more data structures includes writing a begin record including an identity of the transaction and an identity of the primary TSLD, so as to perform the begin operation.

Preferably, writing the data and at least some contents of the one or more data structures includes writing a value corresponding to a commit operation, and updating the one or more data structures includes:
  removing a tag indicative of an open state of the transaction;
  writing a commit record including an identity of the transaction and an identity of the primary TSLD, so as to perform the commit operation; and
  updating a transaction state log.

Preferably, writing the data and at least some contents of the one or more data structures includes writing a value corresponding to an abort operation, and updating the one or more data structures includes:
  removing a tag indicative of an open state of the transaction;
  writing an abort record including an identity of the transaction and an identity of the primary TSLD, so as to perform the abort operation; and
  updating a transaction state log.

Preferably, the method includes scanning the one or more data structures to determine a state of the data transaction.

Preferably, the method includes performing a checkpoint operation inlcuding the steps of:
  locking the one or more data structures;
  writing the contents of the one or more data structures to a checkpoint location in the at least one TSLD; and
  altering at least some of the contents of the one or more data structures responsive to writing the contents to the at least one TSLD.

Preferbly the method includes performing a recovery operation including the steps of:
  reading the contents of the one or more data structures from the at least one TSLD; and
  updating the one or more data structures in the at least one volatile memory responsive to the contents.

Preferably, performing the recovery operation includes reading the contents of all of the one or more data structures written to since performing the checkpoint operation.

Further preferably, performing the recovery operation includes reading the contents of all of the one or more data structures written to since performing the checkpoint operation in a time not substantially greater than the time taken to write all of the one or more data structures written to since performing the checkpoint operation.

Preferably, performing the recovery operation includes determining a state of an open transaction and enabling one or more clients of the open transaction to query the state and decide whether to commit or abort the open transaction.

Preferably, the method includes performing a transaction coordination operation including the steps of:
  choosing one of the at least one TSLDs to be a recorder of a state of the data transaction;
  submitting a begin transaction operation to the recorder;
  waiting for a predetermined time for a response, indicative of the state of the data transaction, from the recorder;
  conditional on the response, submitting one or more soft-write operations to the at least one TSLD; and
  conditional on the response, deciding whether to commit or abort the transaction, by issuing a commit or abort transaction operation. Further preferably, the method includes performing a transaction completion operation including the steps of:
  reading a first set of the succession of data blocks from the at least one TSLD containing contents indicative of a state of the data transaction; and
  responsive to the contents of the first set of the succession of data blocks, writing a second set of the succession of data blocks to the at least one TSLD and storing a set of the one or more data structures to the at least one volatile memory.

Preferably, the data transaction comprises a plurality of concurrent data transactions.

Preferably, the at least one TSLD comprises a disk managed by a server.

Preferably, the at least one TSLD comprises a plurality of TSLDs.

There is further provided, according to a preferred embodiment of the present invention, apparatus for electronic data storage, including:
  a TSLD, adapted to receive a succession of data blocks for storage at respective physical locations therein; and
  control circuitry, which is configured to convey the succession of data blocks to the TSLD while writing to the TSLD, together with at least some of the data blocks, one or more parametersindicative of the physical location of a subsequent data block in the succession.

Preferably, the one or more parameters include a plurality of parameters.

There is further provided, according to a preferred embodiment of the present invention, a method for electronic data storage, including:
  providing a succession of data blocks for storage at respective physical locations in a TSLD;
  determining for each of at least some of the data blocks in the succession one or more parameters indicative of the physical location of a subsequent data block in the succession; and
  storing the succession of the data blocks and the one or more parameters in the TSLD.

Preferably, the one or more parameters include a plurality of parameters.

There is further provided, according to a preferred embodiment of the present invention, a computer software product for performing a data transaction, including a computer-readable medium having program instructions recorded therein, which instructions, when read by a computer, cause the computer to receive data in at least one TSLD as a succession of data blocks, and, together with each of at least some of the data blocks, at least one parameter indicative of a physical location of a subsequent data block in the succession, and to transform a state of the data, in the at least one TSLD, responsive to the at least one parameter, so as to complete the data transaction.

There is further provided, according to a preferred embodiment of the present invention, a computer software product for electronic data storage, including a computer-readable medium having program instructions recorded therein, which instructions, when read by a computer, cause the computer to provide a succession of data blocks for storage at respective physical locations in a TSLD, to determine for each of at least some of the data blocks in the succession one or more parameters indicative of the physical location of a subsequent data block in the succession, and to store the succession of the data blocks and the one or more parameters in the TSLD.

The present invention will be more fully understood from the following detailed description of the preferred embodiments thereof, taken together with the drawings, in which:

DETAILED DESCRIPTION OF PREFERRED EMBODIMENTS

Figure 1A:
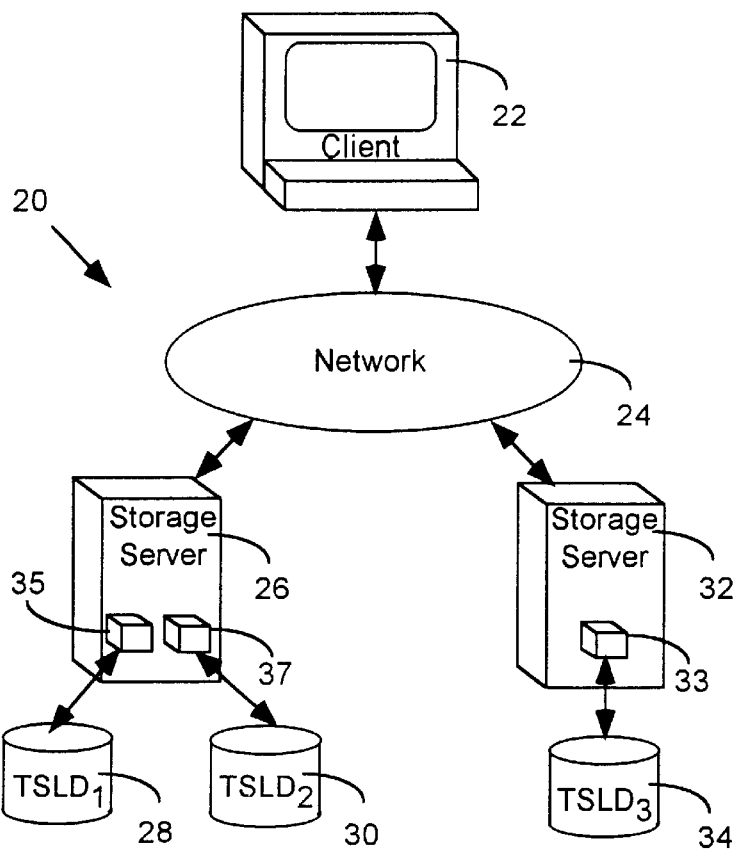
FIG. 1A is a schematic block diagram showing a distributed storage system wherein disks are physically connected to storage servers and wherein transactions occur, according to a preferred embodiment of the present invention.

Reference is now made to FIG. 1A, which is a schematic block diagram showing a distributed storage system 20 wherein transactions occur, according to a preferred embodiment of the present invention. System 20 comprises a plurality of disks 28, 30, and 34 operating as storage devices. Disk 34 is coupled to a storage server 32, comprising control circuitry 33 which enables server 32 to manage the disk. Disks 28 and 30 are coupled to a storage server 26, comprising control circuitry 35 and 37, which respectively enable server 26 to manage the disks. Storage devices managed via appropriate control circuitry, such as disks 28, 30, and 34, are herein termed Transaction Supporting Logical Disks (TSLDs). The control circuitry, herein termed the TSLD interface, performs TSLD operations on the storage device or devices coupled to the circuitry. A detailed description of the structure and operation of a TSLD, a TSLD interface, and TSLD operations, is given hereinbelow. Each disk 28, 30, and 34 within system 20 is allocated a unique identity, herein termed respectively $TSLD_1$, $TSLD_2$, and $TSLD_3$. While system 20 comprises three TSLDs, it will be appreciated that the system can comprise any number of TSLDs, each coupled to and managed by a storage server (hereinbelow referred to simply as a server). It will also be appreciated that each server in system 20 can manage one or more TSLDs.

Servers 26 and 32 are in turn coupled to a data transmission network 24, such as a local area network, to which a client 22 is also coupled. Client 22 is aware of the identities of each of the disks in system 20 and of the respective server managing each disk. Client 22 coordinates the execution of a TSLD transaction. It initiates a TSLD operation, and forwards the TSLD operation to the appropriate storage server or servers together with the identity of the one or more TSLDs to which the operation is to be applied. On receipt of a TSLD operation, each server performs the operation on the one or more TSLDs specified by client 22, and responds to the client.

Figure 1B:
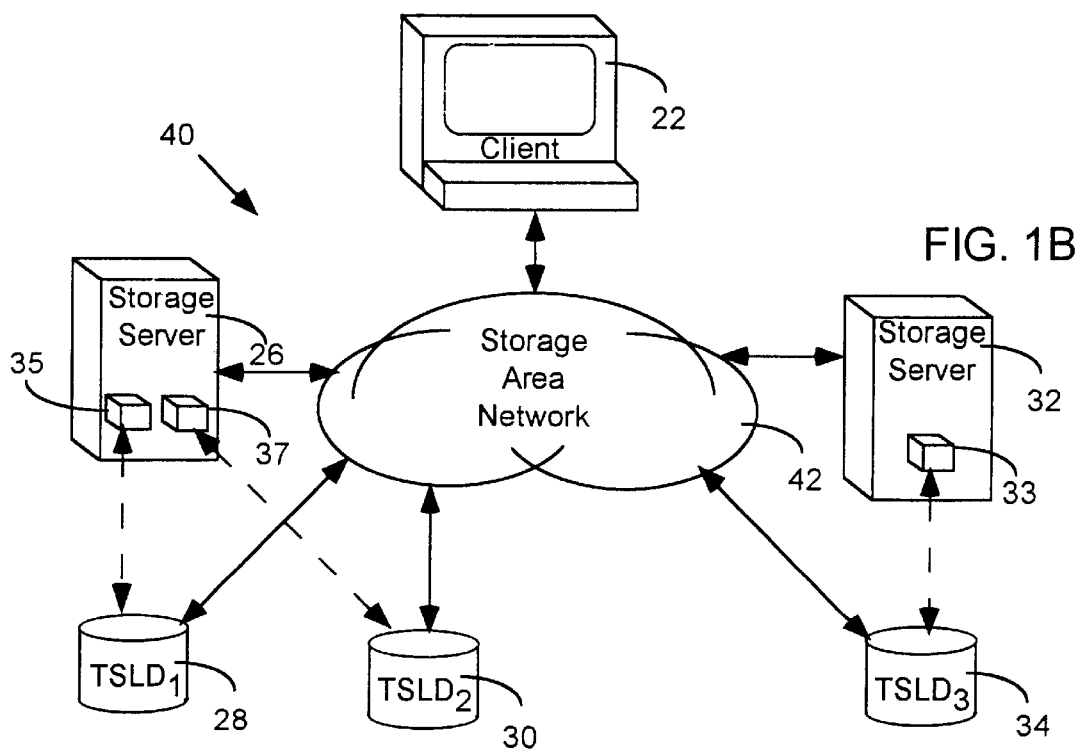
FIG. 1B is a schematic block diagram showing an alternative distributed storage system wherein disks are virtually connected to storage servers and wherein transactions occur, according to a preferred embodiment of the present invention.

FIG. 1B is a schematic block diagram showing an alternative distributed storage system 40 wherein transactions occur, according to a preferred embodiment of the present invention. Apart from the differences described below, the operation of system 40 is generally similar to that of system 20 (FIG. 1A), whereby elements indicated by the same reference numerals in both systems 40 and 20 are generally identical in construction and in operation. System 40 comprises a storage area network 42 to which servers 26 and 32 and disks $TSLD_1$, $TSLD_2$, and $TSLD_3$ are attached. Servers 26 and 32 are virtually coupled to and manage their respective disks via network 42, as shown by broken lines in the figure. Client 22 initiates a TSLD operation by forwarding the operation to the appropriate server or servers via network 42, and each specific server responds to client 22 via the network.

Figure 2:
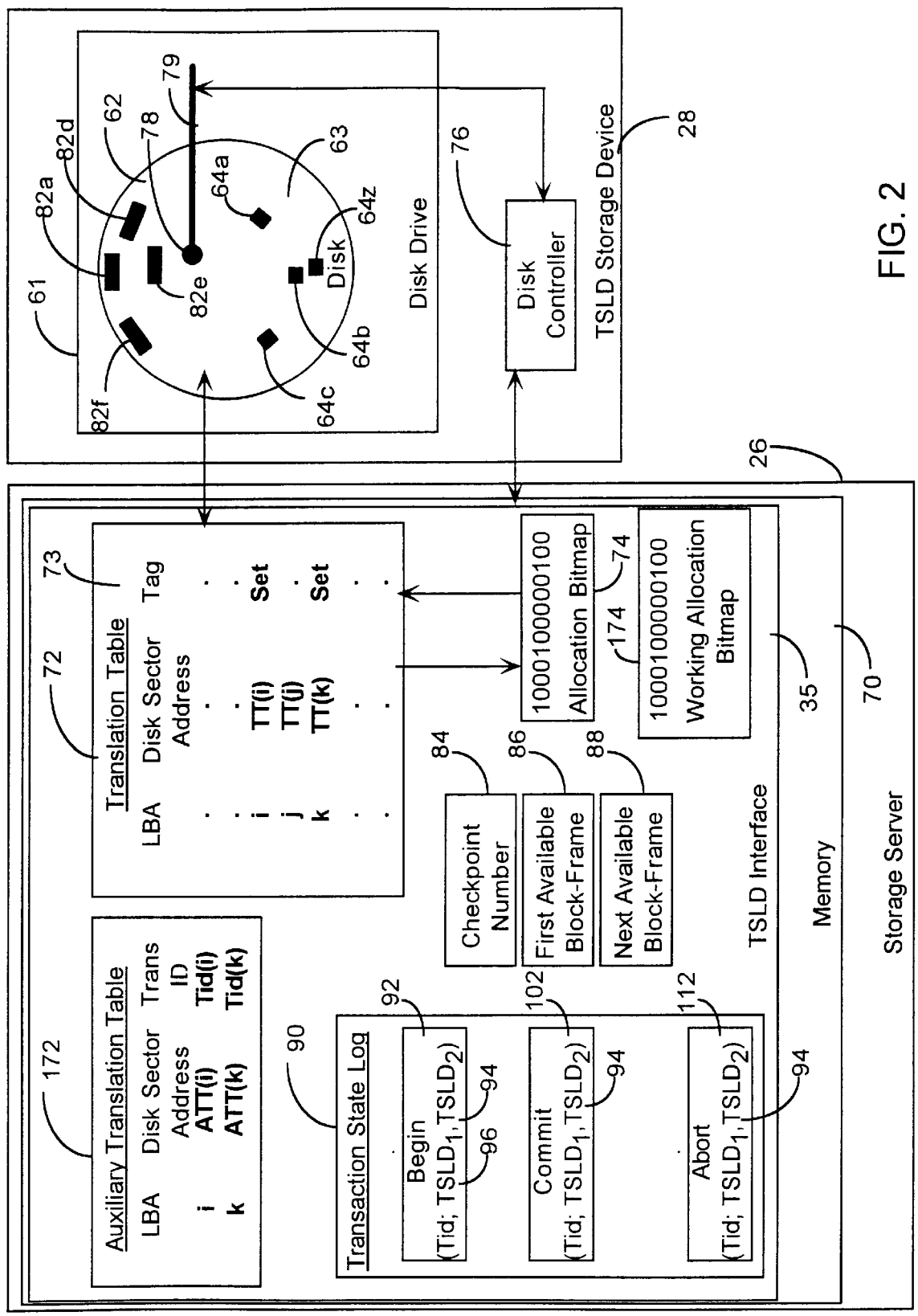
FIG. 2 is a schematic block diagram showing a relationship between a server and a transaction supporting logical disk (TSLD), comprised in the systems of FIG. 1A or 1B, according to a preferred embodiment of the present invention.

FIG. 2 is a schematic block diagram showing a relationship between server 26 and TSLD 28, according to a preferred embodiment of the present invention. While the following description applies to TSLD 28 and its associated TSLD interface 35 comprised in server 26, it will be appreciated that each TSLD and its respective server in system 20 and/or system 40 interact substantially as described hereinbelow for TSLD 28 and server 26.

TSLD 28 comprises a non-volatile storage disk 62 operated by a disk drive 61. Disk 62 is preferably implemented in a magnetic medium 63, which is written to and read from by a disk head 78 on a disk arm 79. As described in more detail below, on block writes disk arm 79 operates in a "move-forward-and-store" motion. The operation of disk 62 is controlled by a disk controller 76. Disk controller 76, disk drive 61 and all components thereof are preferably off-the-shelf, industry-standard items. Magnetic medium 63 is partitioned into a plurality of physical sectors 64a, 64b, 64c, 64z, hereinafter referred to collectively as sectors 64, by methods known in the art. Each physical sector is referenced by a physical sector address. Most preferably, each sector has a size equal to an integral power of 2 bytes, for example 512 bytes.

Data to be stored on disk 62 are written to a plurality of fixed-sized block-frame locations 82a, 82b, 82c, . . . , hereinafter referred to collectively as block-frames 82. Each block-frame is preferably referenced by the physical sector address of the first sector making up the block-frame. Each block-frame 82 is most preferably formed from an integral number of consecutive sectors 64, and each block-frame is able to store a block of data. During formatting of disk 62, some of sectors 64 are reserved for describing physical and logical parameters relating to server 26 and disk 62. The parameters include the size of each sector 64, the number of sectors in disk 62, the size and number of block-frames 82, and a range of logical block addresses (LBAS) supported by disk 62. Also reserved during formatting of disk 62 is space used during a checkpoint operation, in which, inter alia, data stored in a volatile main memory 70 comprised in server 26 are stored to disk 62. The checkpoint operation is described in more detail below.

Volatile memory 170 stores a number of volatile dynamic data structures, described in detail hereinbelow, which act as a TSLD interface 35. The content of the data structures is preferably controlled by server 26.

Memory 70 stores as TSLD interface 35:

A translation table data structure 72 which translates between LBAs and physical block addresses. The translation table binds each logical block address "i" to a corresponding physical address of a block-frame, herein termed TT(i), of disk 62. TT(i) is most preferably the first sector of a block-space that accommodates the most recently stored contents, of the block whose logical address is "i." Initially, all values of TT(i) are set to a NULL value. As data are written to disk 62, values of TT(i) for specific logical block addresses i are changed from their NULL value and are updated to become the disk sector address of the block-space where the block i was last stored. Translation table 72 also comprises a tag field 73, whereby a tag for each entry TT(i) in translation table 72 can be set to indicate that block "i" is currently engaged in an open transaction. While a specific tag is set, the respective entry TT(i) points to a non-committed block-frame. As described below, the committed block-frame for block i can be found using an auxiliary translation table entry, ATT(i). If a TT(i) entry is not tagged, then TT(i) points to a committed block-frame for block i.

An auxiliary translation table (ATT) data structure 172, which is a condensed form of table 72, comprising non-NULL entries of table 72 wherein tag field 73 has been set. In other words, auxiliary translation table 172 tracks blocks which are currently involved in an open transaction. Table 172 comprises an entry for each block i involved in an open transaction, a corresponding block-frame address ATT(i) where block i is stored prior to the open transaction, and an identity 'Trans ID' of the transaction in which block i is currently involved.

An allocation bitmap data structure 74, which is used to locate available disk block-frames 82 during each store of blocks to disk 62. For each block-frame i, a corresponding bit in allocation bitmap 74 is set to be 0 if the block-frame is available for storage of block contents. The corresponding bit is set to 1 if the block-frame contains the contents of a block, or if the block-frame has been reserved for use by server 26 data structures. When disk 62 is initialized, all block-frames except for those reserved for server 26 are made available so that each bit in allocation bitmap 74 is set to 0.

A working allocation bitmap data structure 174. Working bitmap 174 is a copy of allocation bitmap 74 made when the last checkpoint operation was performed.

A checkpoint-number data structure 84, which records the numb er of checkpoint operations which have been executed. A checkpoint operation is executed automatically when disk arm 79 has completed a mov,e-forward-and-store motion and is about to start another motion. Initially, checkpoint-number 84 is set to 0.

Two pointer data structures, a first-available-block-frame pointer 86, and a next-available-block-frame pointer 88. First-available-block-frame pointer 86 points to the first available block-frame when a checkpoint operation takes place. Next-available-block-frame pointer 88 points to an available block-frame which will be used by a next block store operation. Pointer 88 is updated on each block store operation.

When a disk recovery is performed, the addresses of block-frames after the block-frame pointed to by first-available-block-frame pointer 86 are recovered by server 26 "replaying" the process of block storage since the last checkpoint. Initially, both pointers are set to the address of the first non-reserved block-frame.

A transaction state log data structure 90, which contains a list of records about transaction states. Each transaction is assigned a universally unique identifier, herein termed Tid. Records of log 90 include Tid and associates with Tid a list 94 of TSLDs participating in the transaction. A log record consists of three parts: a record type, a transaction identifier, and list 94. The types of records, begin-transaction, commit-transaction, and abort-transaction, entered into log 90, are described in detail hereinbelow.

Each data structure component described hereinabove, i.e., translation table 72, auxiliary translation table 172, allocation bitmapl 74, working allocation bitmap 174, checkpoint-number 84, first-available-block-frame pointer 86, next-available-block-frame pointer 88, and transaction state log 90, is maintained in main memory 70 as TSLD interface 35 and is stored to TSLD 28 during a checkpoint operation for TSLD 28.

When a new block-frame is required for storing data, a block-frame is allocated from the free block-frames available on disk 62, according to allocation bitmap 74, and working allocation bitmap 174 is updated to reflect the new allocation. To choose which block-frame is written to, server 26 notes the value of next-available-block frame pointer 88. Server 26 uses this value, together with allocation bitmap 74, to locate the next available block-frame having an address forward of the block-frame last written to. Thus, disk arm 79 moves in a move-forward-and-store motion, until a checkpoint operation is called. Further details regarding move-forward-and-store methods are described in the above-referenced provisional patent application 60/176507and in the patent application "Enhanced Stable Disk Storage" filed Jul. 6, 2000, assigned to the assignee of the present invention.

When a client initiates a transaction on a plurality of TSLDs, the client selects one of the TSLDs, preferably the TSLD with the smallest identification, as a primary TSLD. The primary TSLD acts as a recorder of the transaction state. Records of transaction state log 90 are most preferably of three types, as described hereinbelow.

A begin-transaction record 92 records the fact that a transaction Tid has begun and lists in a list 94 the TSLDs which are participating in the transaction. A first TSLD 96 on list 94 is the selected primary TSLD for transaction Tid. A notation for begin-transaction record 92 used herein is:

$$\text{Begin } (Tid; TSLD_1, TSLD_2 \ldots TSLD_m)$$

wherein $TSLD_1$ is the primary TSLD, and $TSLD_2 \ldots TSLD_m$ are the other TSLDs participating in transaction Tid.

A commit-transaction record 102 records the fact that a transaction is committed. Each commit-transaction record 102 comprises an identity Tid of the transaction and list 94 of TSLDs participating in the transaction. A notation for commit-transaction record 102 used herein is:

$$\text{Commit } (Tid; TSLD_1, TSLD_2 \ldots TSLD_m)$$

An abort-transaction record 112 records the fact that a transaction is aborted. Each abort-transaction record 112 comprises an identity Tid of the transaction and list 94 of TSLDS participating in the transaction. A notation for abort-transaction record 112 used herein is:

$$\text{Abort } (Tid; TSLD_1, TSLD_2 \ldots TSLD_m)$$

Most preferably, each begin-transaction record 92 is only stored in the transaction log of the primary TSLD for transaction Tid until, as described hereinbelow, the transaction is committed or aborted.

Most preferably, each commit-transaction record 102 is stored in transaction state log 90 of the primary TSLD of transaction Tid. Preferably, the commit-transaction record remains in the transaction state log of a specific TSLD after data structures relevant to transaction Tid have been updated in the specific TSLD, for the benefit of other TSLDs which may not yet know that the transaction is committed. On a specific primary TSLD, the commit-transaction record replaces the begin-transaction record.

Most preferably, each abort-transaction record 112 is stored in transaction log 90 of the primary TSLD of transaction Tid. Preferably, each abort-transaction record 112 remains in the transaction log of a specific TSLD after data structures relevant to the Tid have been updated in the specific TSLD, for the benefit of other TSLDs which may not yet know that the transaction is aborted. On a specific primary TSLD, the abort-transaction record replaces the begin-transaction record.

On non-primary TSLDs the abort-transaction and commit-transaction records in which the non-primary TSLDs are involved are preferably maintained until the next checkpoint.

Figure 3:
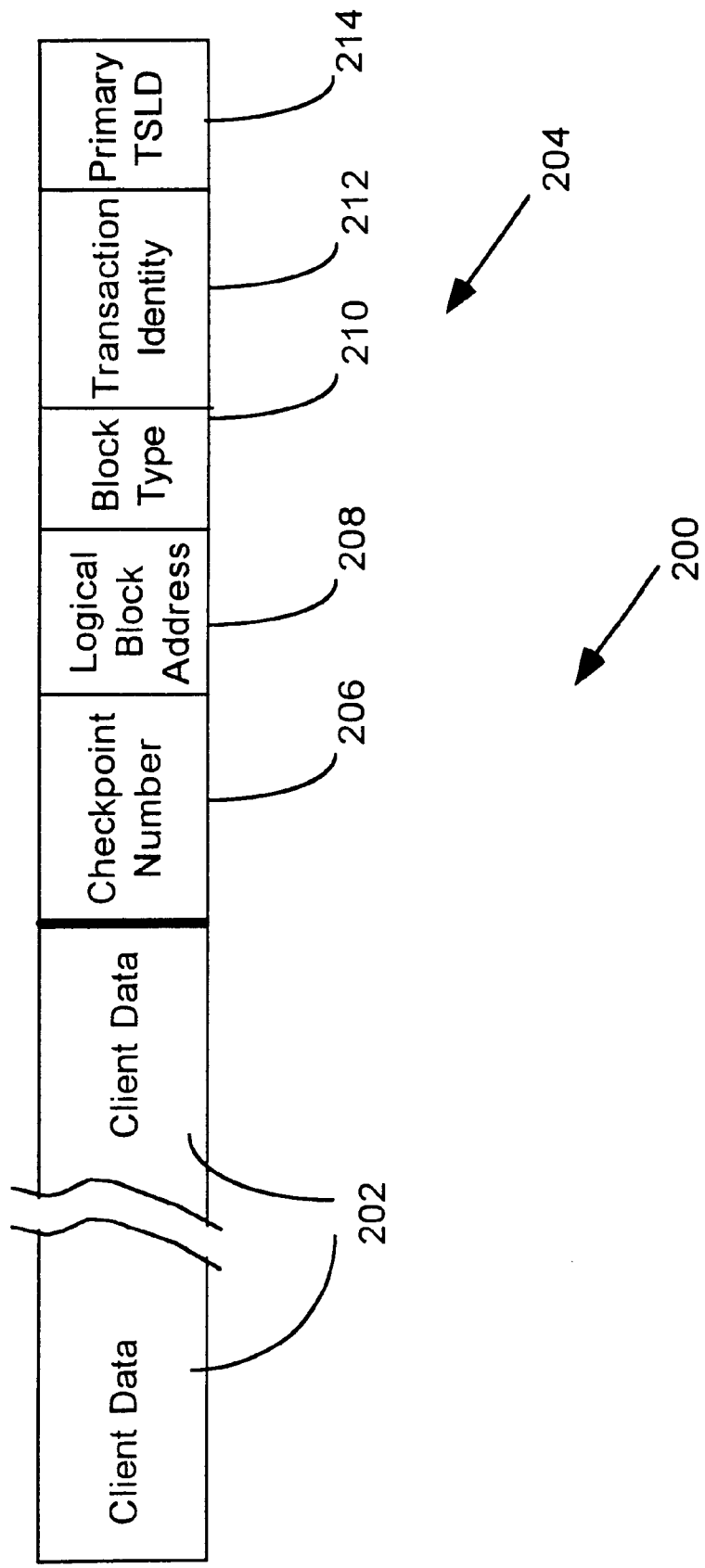
FIG. 3 is a schematic block diagram of an on-disk block structure stored by a TSLD, according to a preferred embodiment of the present invention.

FIG. 3 is a schematic diagram of an on-disk block structure stored by TSLD 28, according to a preferred embodiment of the present invention. Data are stored as a block 200 into a specific block-frame 82. Block 200 comprises a client part 202, used by client 22 to store its content data, and a trailer 204 comprising fields used by TSLD 28. Trailer 204 comprises the following fields:

an on-disk checkpoint-number field 206, wherein is stored a current value of checkpoint-number 84. This is the checkpoint number at the time of the block store operation.

a logical block address (LBA) field 208, wherein is stored the LBA of block 200.

a block-type field 210, wherein is stored a tag describing a type of block 200. Types of block 200 are described hereinbelow.

a transaction-identity field 212, wherein is stored the identity Tid of the transaction in which block 200 is participating. Alternatively, if block 200 is not participating in a transaction when the block is stored, field 212 is set to 0.

a primary TSLD field 214, wherein is stored an identity TSLDp of the primary TSLD of the transaction in which block 200 is participating. Alternatively, if block 200 is not participating in a transaction when the block is stored, field 214 is set to 0.

Block-type field 210 may assume the following types of blocks:

A data block type wherein content data from client 22 are stored in client data field 202, and wherein the block-frame in which the block is stored is referenced by translation table 72, and wherein the block is not part of an open transaction.

A soft-write block type wherein content data from client 22 are stored in client data field 202, and the non-committed block-frame within which the data is stored is referenced by table 72, but the block-frame within which the old committed contents of the block are stored is not released for use by client 22, rather it is referenced by table 172. Both block frames are marked allocated in allocation bitmap 74.

A begin-block type wherein specific transaction identity Tid is stored, together with identities of TSLDs participating in transaction Tid, in field 202. This type of block records the fact that transaction Tid has begun, and the begin-block occupies its respective block-frame only until the next checkpoint operation. After a successful checkpoint operation the block-frame occupied is released as described above.

A commit-block type wherein specific transaction identity Tid is stored, together with identities of TSLDs participating in transaction Tid, in field 202. A specific commit-block records the fact that transaction Tid is committed and occupies its respective block-frame only until the next checkpoint. After a successful checkpoint operation the block-frame occupied is released as described above.

An abort-block type wherein specific transaction identity Tid is stored, together with identities of TSLDs participating in transaction Tid, in field 202. A specific abort-block records the fact that transaction Tid is aborted and occupies its respective block-frame only until the next checkpoint. After a successful checkpoint operation the block-frame occupied is released as described above.

Figure 4:
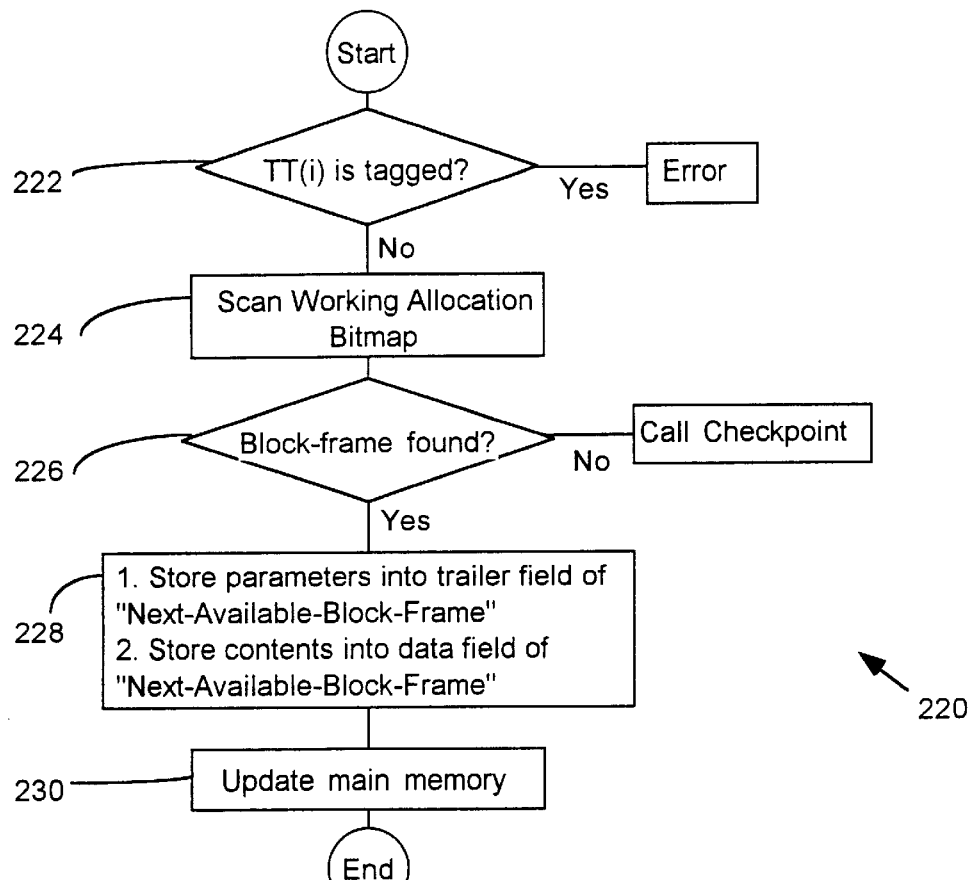
FIG. 4 is a flowchart showing steps involved in a soft-write operation, according to a preferred embodiment of the present invention.

FIG. 4 is a flowchart showing steps involved in a soft-write operation 220, according to a preferred embodiment of the present invention. Soft-write operation 220 stores contents of a transaction Tid, the primary TSLD with a value of primTSLD, into each block-frame updated by transaction Tid. A notation for soft-write operation 220 used herein is:

Soft-Write(Tid, prim$TSLD$, $i$, contents)

Hereinbelow TSLD 28 is assumed to be one of the participating TSLDs, and operation 220 is assumed to be initiated by client 22. Operation 220 also associates the contents with an LBA $i$, without losing the old contents of LBA $i$. Soft-write operation 220 acts as a temporary write operation which can be either committed or aborted at a later time, and thus acts as the first phase of a two-phase-commit protocol, described in the Background of the Invention.

Figure 16:
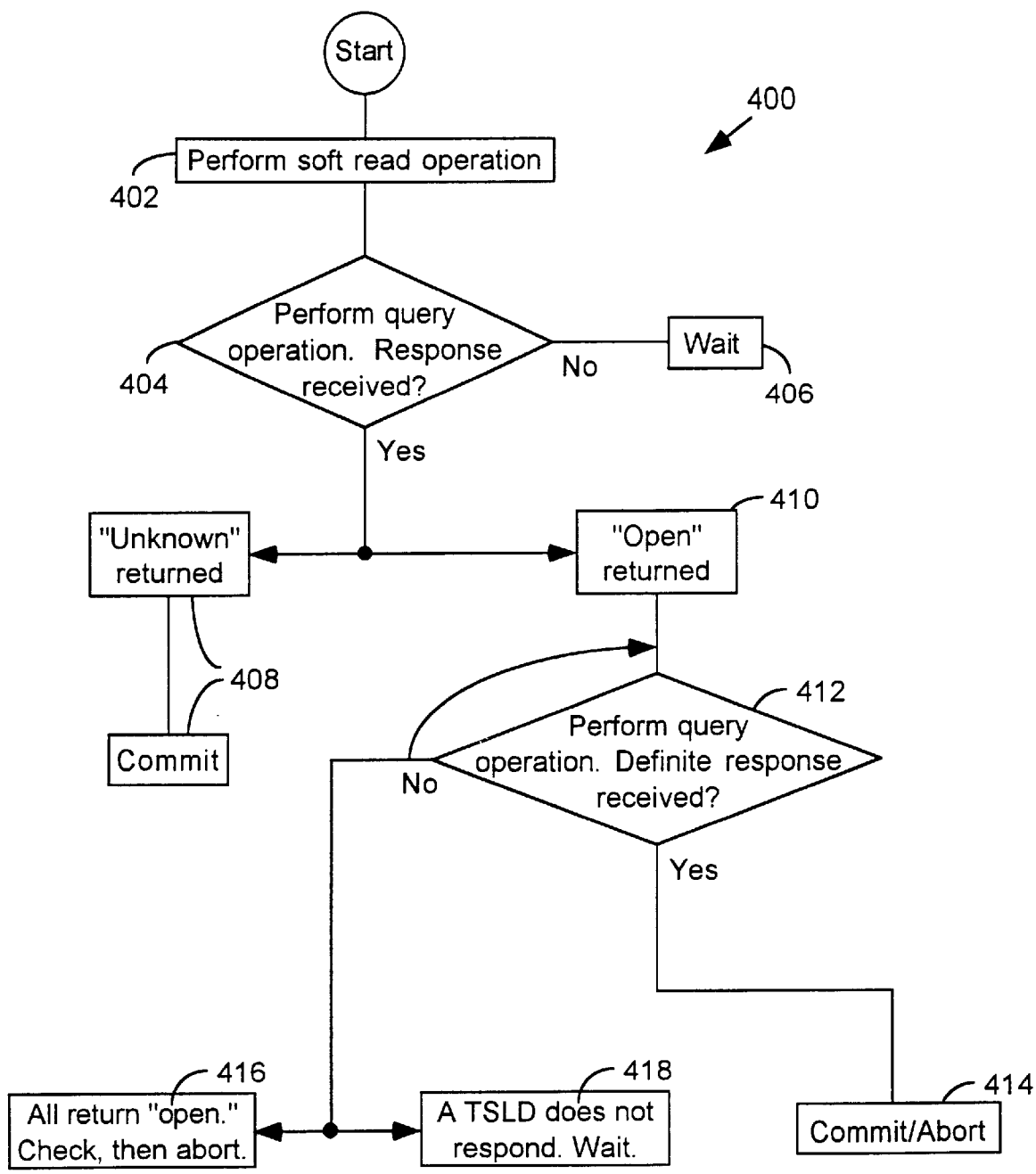
FIG. 16 is a flowchart showing steps involved in a transaction completion operation, according to a preferred embodiment of the present invention.

In a check step 222, translation table 72 is checked to find if the entry corresponding to LBA $i$, TT($i$), has its tag set. If the tag is set, an open-transaction-error code, whose function is described below with reference to FIG. 16, is returned to client 22. If the tag is not set, in a scan step 224, allocation bitmap 74 is scanned to find the first available block-frame following the block-frame recorded in Next-Available-Block-frame 88. If no block-frame is found to be available in an availability check step 226, a checkpoint operation, described below, is performed. If a block-frame is found, its physical address is assumed to be "a."

In a store step 228, the values checkpoint-number, LBA $i$, transaction identity Tid, and primary TSLD primTSLD, are written to respective trailer fields 206, 208, 212, and 214 (FIG. 3) of the block in the block-frame recorded in Next-Available-Block-frame 88. A value corresponding to the type of block, i.e., a soft-write block type, is written to trailer field 210 of the block-frame. In addition, the data contents of Tid, as supplied by client 22, are written to data field 202 of the block-frame.

In an update step 230, in memory 26 the following assignments are performed:

in working allocation bitmap 174, A(Next-Available-Block-frame)←1;

in auxiliary translation table 172, (ATT($i$), Trans ID)←<TT($i$), Tid>;

in translation table 72 TT($i$)←Next-Available-Block-frame, and the tag of TT($i$) is set in tag field 73; and data structure Next-Available-Block-frame 88 is set to value "a."

It will be understood that soft-write operation 220 writes data and trailer field data to the block in Next-Available-Block-frame 88 as part of a transaction that has not been completed. However, the specific block-frame used to hold the old contents of $i$ is not changed, and that specific block-frame is not released by its allocation bit being set to 0, so that the old contents may still be accessed if required.

Figure 5:
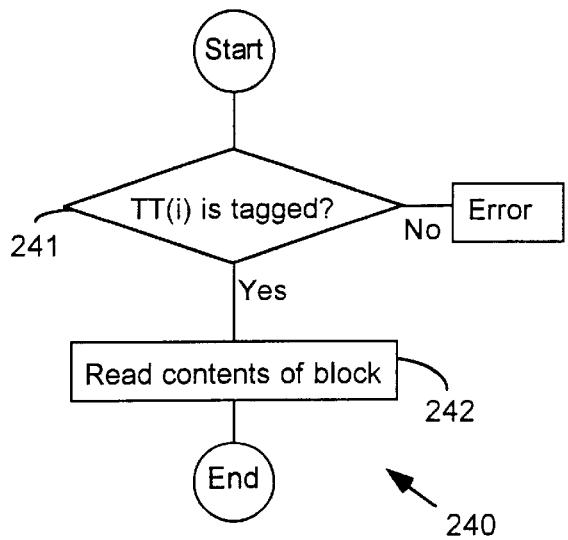
FIG. 5 is a flowchart showing steps involved in a soft-read operations according to a preferred embodiment of the present invention.

FIG. 5 is a flowchart showing steps involved in a soft-read operation 240, according to a preferred embodiment of the present invention. Soft-read operation 240 reads the data contents which have been stored in a soft-write operation 220, as part of an uncompleted transaction. A notation for soft-read operation 240 used herein is:

Soft-Read($i$)

In a check step 241, translation table 72 is checked to find if the entry corresponding to LBA $i$, TT($i$), has its tag set. If the tag is not set, an open-transaction-error code is returned to client 22. If the tag is set, in a read step 242, a requester such as client 22 requests data contents 202 of the block in the block-frame pointed to in translation table 72 by TT($i$). Data contents 202 are returned to the requester, and soft-read operation 240 then terminates.

Figure 6:
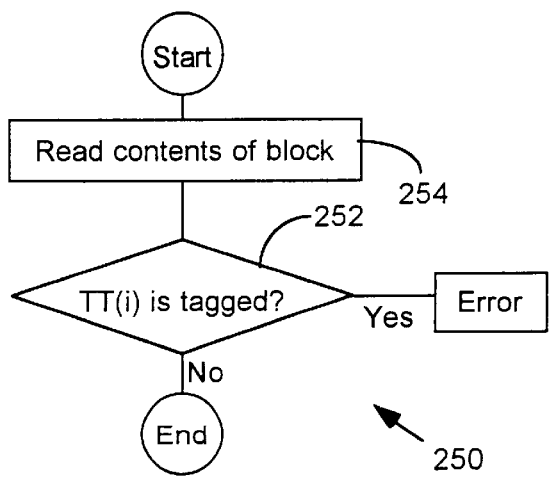
FIG. 6 is a flowchart showing steps involved in a read operation, according to a preferred embodiment of the present invention.

FIG. 6 is a flowchart showing steps involved in a read operation 250, according to a preferred embodiment of the present invention. Operation 250 is used to read the data contents of a logical block $i$ in a block-frame which has completed a transaction, and return the contents to a requester such as client 22. A notation for read operation 250 used herein is:

Read($i$)

In a first step 254, data contents 202 of the block in the block-frame pointed to in translation table 72 by TT($i$) is read from the TSLD. Operation 250 continues by checking if the tag of TT($i$) is set. If the tag is set, showing that a transaction involving TT($i$) has not completed, an open-transaction-error error signal is returned to the requester with the block-frame previously read. If the tag of TT($i$) is not set, showing that the block is not involved in an open transaction, operation 250 completes by returning the block-frame to the user. Operation 250 then terminates.

Figure 7:
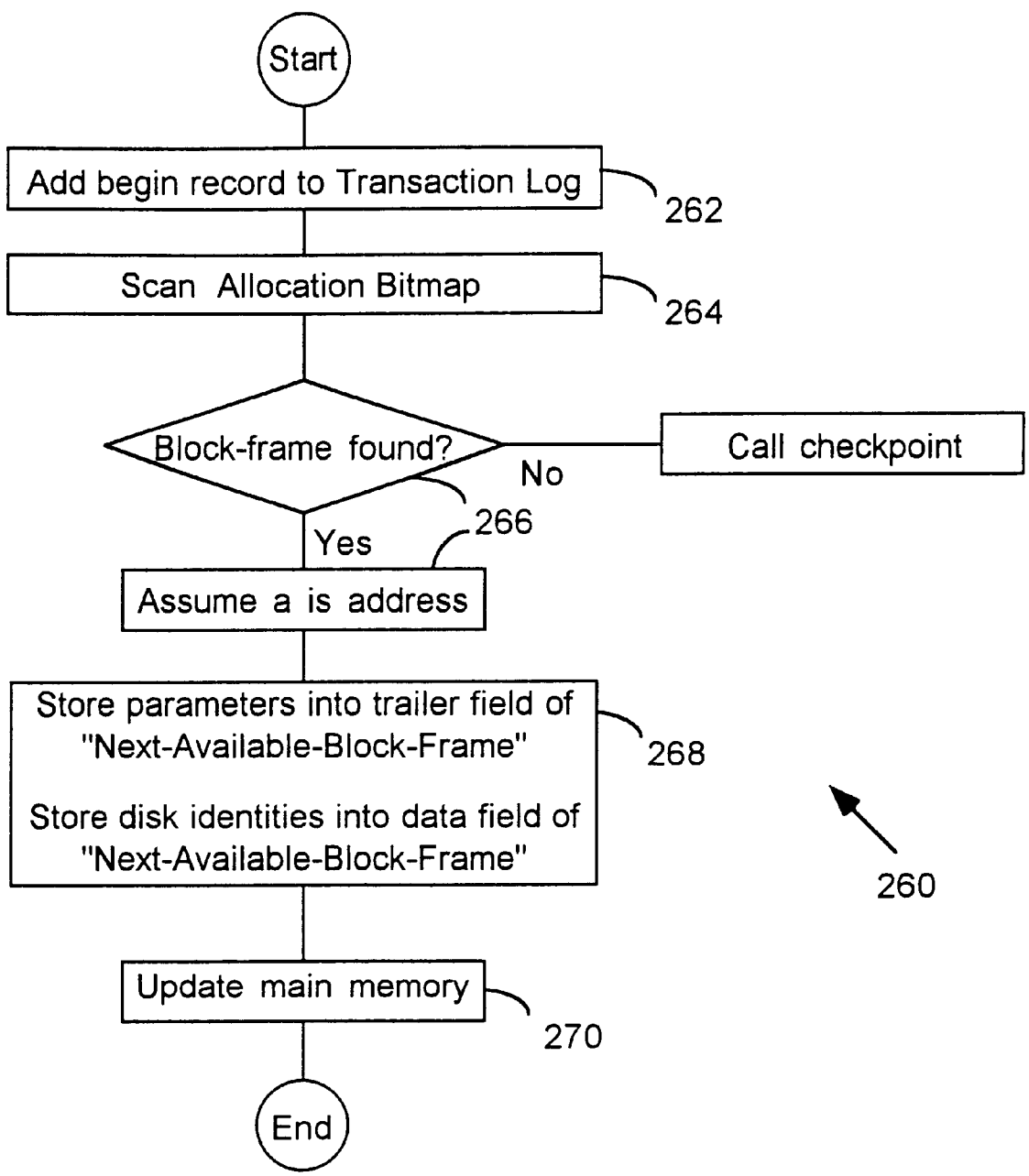
FIG. 7 is a flowchart showing steps involved in a begin operation, according to a preferred embodiment of the present invention.

FIG. 7 is a flowchart showing steps involved in a begin operation 260, according to a preferred embodiment of the present invention. Operation 260 stores a block, herein termed a begin-block, which temporarily records details of a transaction, on a primary TSLD. Operation 260 also stores begin-transaction record 92, Begin(Tid; $TSLD_1$, $TSLD_2$, . . . $TSLD_m$), described hereinabove with reference to FIG. 2. The transaction is assumed to have an identity Tid, and to involve the following TSLDS: $TSLD_1$, $TSLD_2$, . . . $TSLD_m$. Most preferably, $TSLD_1$ acts as the primary TSLD (primTSLD) of transaction Tid. A transaction coordinator, herein assumed to be client 22, initiates begin operation 260 on the primary TSLD, i.e., on $TSLD_1$. A notation for begin operation 260 used herein is:

Begin(Tid; prim$TSLD$, $TSLD_2$, $TSLD_3$, . . . $TSLD_m$)

In a record step 262, the identity Tid and participating TSLDs $TSLD_1$, $TSLD_2$, $TSLD_3$, . . . $TSLD_m$ of the transaction are recorded in transaction log 90. In a scan step 264 allocation bitmap 74 is scanned to find the first available block-frame following the block-frame recorded in Next-Available-Block-frame 88. If no block-frame is found to be available in an availability check step 266, a checkpoint operation is performed. If a following block-frame is found, its physical address is assumed to be "a."

In a store step 268, the values checkpoint-number, transaction identity Tid, and $TSLD_1$ (primTSLD), are written to respective trailer fields 206, 212, and 214 (FIG. 3) of the block in the block-frame recorded in Next-Available-Block-frame 88, herein assumed to have a physical address "p." A value corresponding to the type of block, i.e., a begin block type, is written to trailer field 210 of the block. No entry is made in logical address field 208. Also in store step 268, the identities of participating TSLDs $TSLD_1$, $TSLD_2$, . . . $TSLD_m$ of the transaction are recorded in data field 202 of the block in block-frame "p."

In an update step 270, in memory 26 data structure Next-Available-Block-frame 88 is set to value "a."Operation 260 then terminates.

It will be noted that working allocation bitmap 174 is not updated in operation 260, i.e., A(p) remains set at 0. Thus block-frame "p" remains marked as free. However, at the completion of operation 260 "a" is greater than "p", so that operations subsequent to operation 260 will always look for blocks having physical addresses greater than "p." Thus block-frame "p" will not be stored to during the current pass of disk arm 79. The current pass terminates when a checkpoint operation is performed, during which all the relevant parameters in block-frame "p" are stored to disk 62. After the checkpoint operation, block-frame "p" then becomes available for further store operations.

Figure 8:
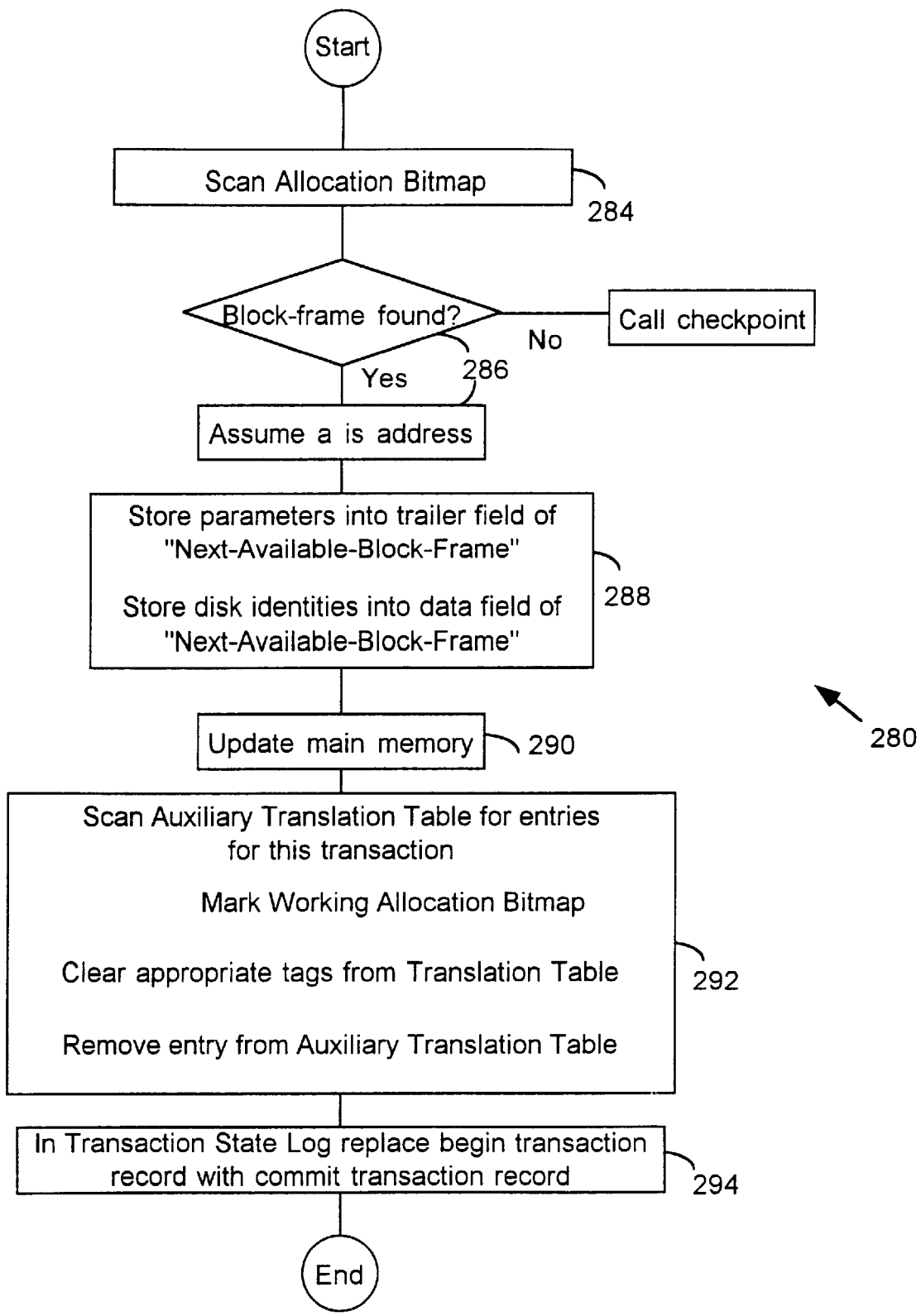
FIG. 8 is a flowchart showing steps involved in a commit operation, according to a preferred embodiment of the present invention.

FIG. 8 is a flowchart showing steps involved in a commit operation 280, according to a preferred embodiment of the present invention. Operation 280 should be performed after all soft-write operations 220 associated with a given transaction have terminated successfully, and makes the temporary write operations performed there permanent. Operation 280 as for soft-write operation 220, should be performed on each TSLD involved in transaction Tid. A notation for commit operation 280 used herein is:

Commit(*Tid*; prim*TSLD*, $TSLD_2$, $TSLD_3$, . . . $TSLD_m$)

Steps 284, 286, and 288, described hereinbelow, store a commit-block to disk 62. The commit-block stored acts as a temporary storage of the commit operation until a subsequent checkpoint operation is performed.

In scan step 284 allocation bitmap 74 is scanned to find the first available block-frame following the block-frame recorded in Next-Available-Block-frame 88. If no block-frame is found to be available in availability check step 286, a checkpoint operation is performed. If a following block-frame is found, its physical address is assumed to be "a."

In store step 288, the values checkpoint-number, transaction identity Tid, and $TSLD_1$ (primTSLD), are written to respective trailer fields 206, 212, and 214 (FIG. 3) of the block in the block-frame recorded in Next-Available-Block-frame 88, herein assumed to have a physical address "p." A value corresponding to the type of block, i.e., a commit block type, is written to trailer field 210 of the block-frame. No entry is made in logical address field 208. Also in store step 288, the identities of participating TSLDs $TSLD_1$, $TSLD_2$, . . . $TSLD_m$ of the transaction are recorded in data field 202 of the block in block-frame "p."

In an update step 290, in memory 26 data structure Next-Available-Block-frame 88 is set to value "a."

In a scan step 292, auxiliary translation table 172 is scanned for entries comprising transaction identity Tid. For each entry found, The corresponding bit in working allocation bitmap 174 is set to 0, so that the block-frame pointed to by the entry becomes available.

In translation table 72 tags of each entry corresponding to those found in auxiliary translation table 172 are cleared.

The entry in auxiliary translation table 172 is removed, so maintaining table 172 in a condensed form.

In a record step 294, if TSLD 28 is the primary TSLD $TSLD_1$, the begin transaction record of transaction log 90, as performed in record step 262 (FIG. 7), is replaced by a commit record of transaction Tid and the participating TSLDs, and commit operation 280 then terminates. If TSLD 28 is not the primary TSLD, operation 280 terminates after step 292.

It will be appreciated that block-frame "p" is only occupied until the next checkpoint operation, after which the block-frame becomes available.

Figure 9:
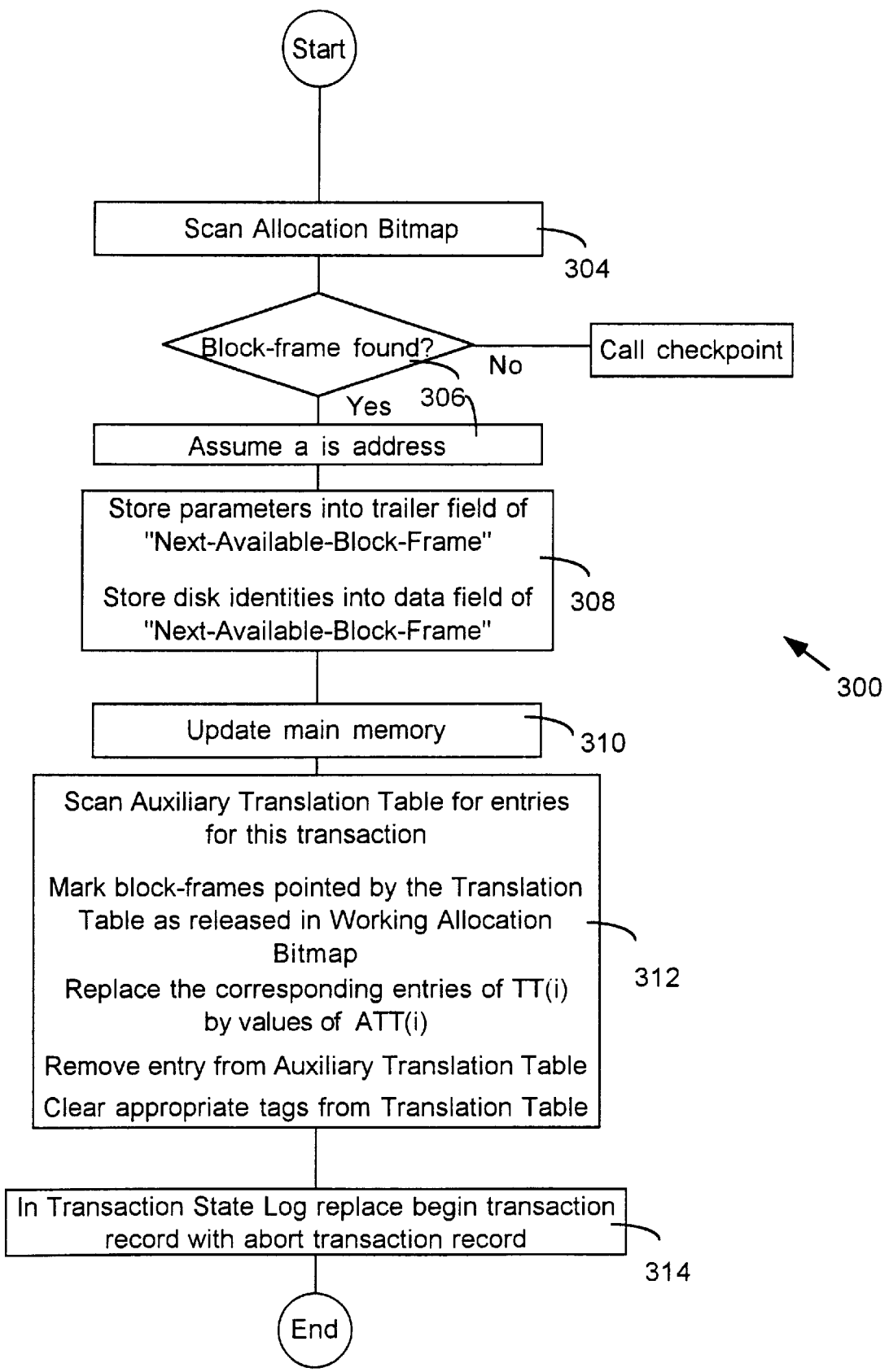
FIG. 9 is a flowchart showing steps involved in an abort operation, according to a preferred embodiment of the present invention.

FIG. 9 is a flowchart showing steps involved in an abort operation 300, according to a preferred embodiment of the present invention. Operation 300 should be performed if one of the soft-write operations 220 associated with a given transaction has failed. Operation 300 withdraws from the temporary write operations performed in operation 220, and makes available the contents of block-frames before operation 220 was performed. Operation 300, as for soft-write operation 220, is performed on each TSLD involved in transaction Tid. A notation for abort operation 300 used herein is:

Abort(*Tid*; prim*TSLD*, $TSLD_2$, $TSLD_3$, . . . $TSLD_m$)

Steps 304, 306, 308, and 310 store an abort-block to disk 62. The abort-block stored acts as a temporary storage of the abort operation until a subsequent checkpoint operation is performed. Steps 304, 306, and 310 are respectively substantially similar in operation to steps 284, 286, and 290, described hereinabove. In store step 308, the values checkpoint-number, transaction identity Tid, and $TSLD_1$ (primTSLD), are written to respective trailer fields 206, 212, and 214 (FIG. 3) of the block in the block-frame recorded in Next-Available-Block-frame 88, herein assumed to have a physical address "q." A value corresponding to the type of block, i.e., an abort block, is written to trailer field 210 of the block. No entry is made in logical address field 208. Also in store step 308, the identities of participating TSLDs $TSLD_1$, $TSLD_2$, . . . $TSLD_m$ of the transaction are recorded in data field 202 of the block in block-frame "q."

In a scan step 312, auxiliary translation table 172 is scanned for entries comprising transaction identity Tid. For each entry found, translation table 72 is used to locate the corresponding block-frame. The corresponding bit in working allocation bitmap 174 is then reset. Also in step 312, after the bits have been reset, translation table 72 is updated so that the entries found now point to the entries found in auxiliary translation table 172. Finally, each entry in auxiliary translation table 172 is removed, and the tags for each corresponding entry in translation table 72 are removed.

In a record step 314, if TSLD 28 is the primary TSLD ($TSLD_1$) the begin transaction record of transaction log 90, as performed in record step 262 (FIG. 7), is replaced by an abort record of transaction Tid and the participating TSLDs, and abort operation 300 then terminates. If TSLD 28 is not the primary TSLD, operation 300 terminates after step 312.

It will be appreciated that block-frame "q" is only occupied until the next checkpoint operation, after which the block-frame becomes available.

Figure 10A:
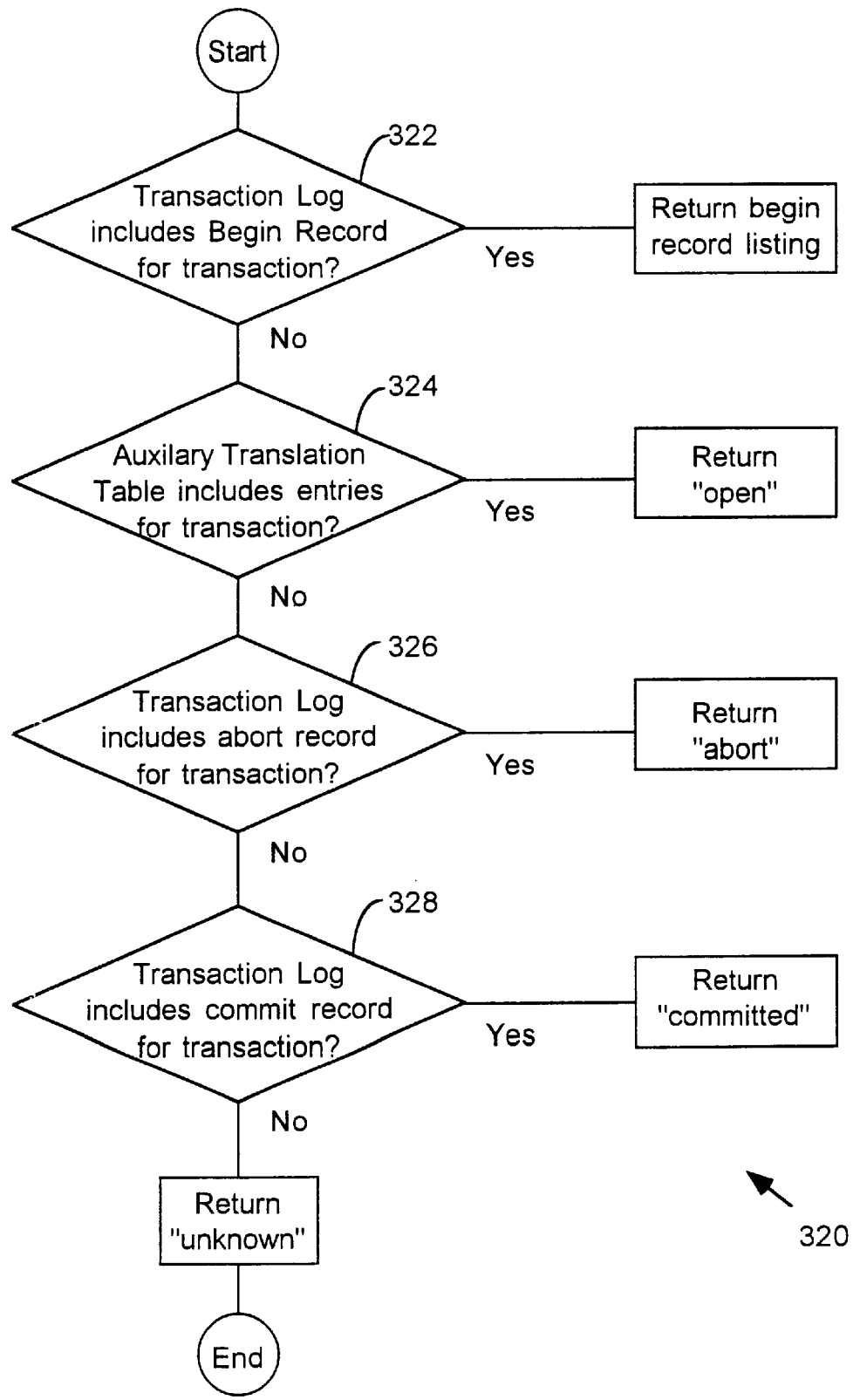
FIG. 10A is a flowchart showing steps involved in a query operation, according to a preferred embodiment of the present invention.

FIG. 10A is a flowchart showing steps involved in a query operation 320, according to a preferred embodiment of the present invention. For each TSLD in system 20 or system 40, query operation 320 checks transaction state log 90 regarding the state of a specific transaction Tid and returns what is known about the transaction to a requester such as client 22. A notation for query operation 320 used herein is:

Query$_{State}$(Tid)

In a first query 322, log 90 is checked to see if a begin record for the specific transaction exists. If the begin record does exist, indicating that the TSLD queried is the primary TSLD and that transaction Tid is still in process, i.e., is open, a return open state with the list of participating TSLDs (taken from the begin record) is returned. The listing shows that the transaction is open and lists the other participating TSLDs.

If a begin record does not exist, operation 320 continues to a second query 324, wherein auxiliary translation table 172 is checked to see if the table includes entries for transaction Tid. If the table does include one or more entries for Tid, showing that the transaction is in process, an "open" statement is returned.

If the answer to query 324 is negative, operation 320 continues to a third query 326, wherein transaction log 90 is checked to see if an abort record for the specific transaction exists. If an abort record does exist, an "aborted" statement is returned.

If the answer to query 326 is negative, operation 320 continues to a fourth query 328, wherein transaction log 90 is checked to see if a commit record for the transaction exists. If a commit record does exist, a "committed" statement is returned. If a commit record does not exist an "unknown" statement is returned, and operation 320 terminates.

Figure 10B:
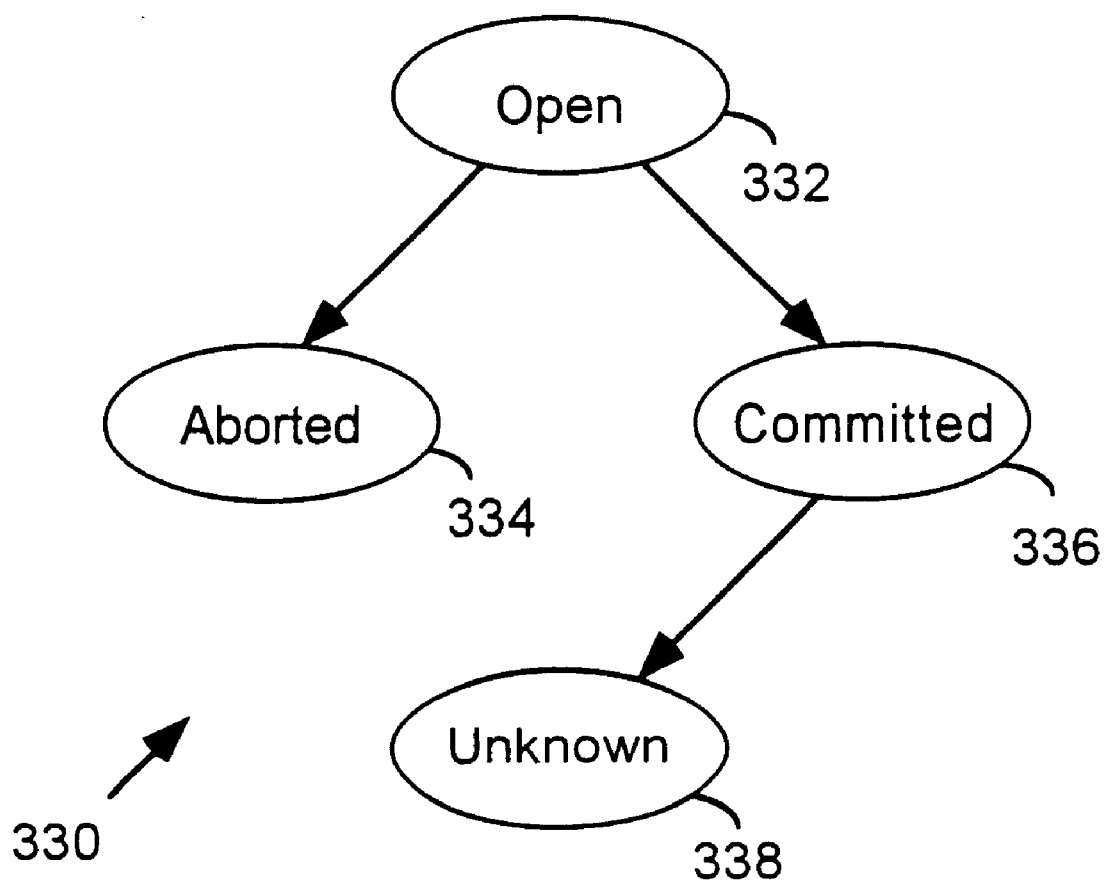
FIG. 10B is a state diagram of possible results from the query operation of FIG. 10A, according to a preferred embodiment of the present invention.

FIG. 10B is a state diagram 330 of possible results from operation 320 on a specific TSLD, according to a preferred embodiment of the present invention. As is shown in diagram 330, a specific transaction Tid can exist in an open state 332, an aborted state 334, a committed state 336, or an unknown state 338.

If the primary TSLD for a transaction Tid responds to a query state with "unknown," while another non-primary TSLD responds to the query with an "open" state, it can be deduced that the transaction has been committed. This may happen when the transaction has successfully executed commit operation in the primary TSLD, but failed to do it on a non-primary TSLD.

Figure 11:
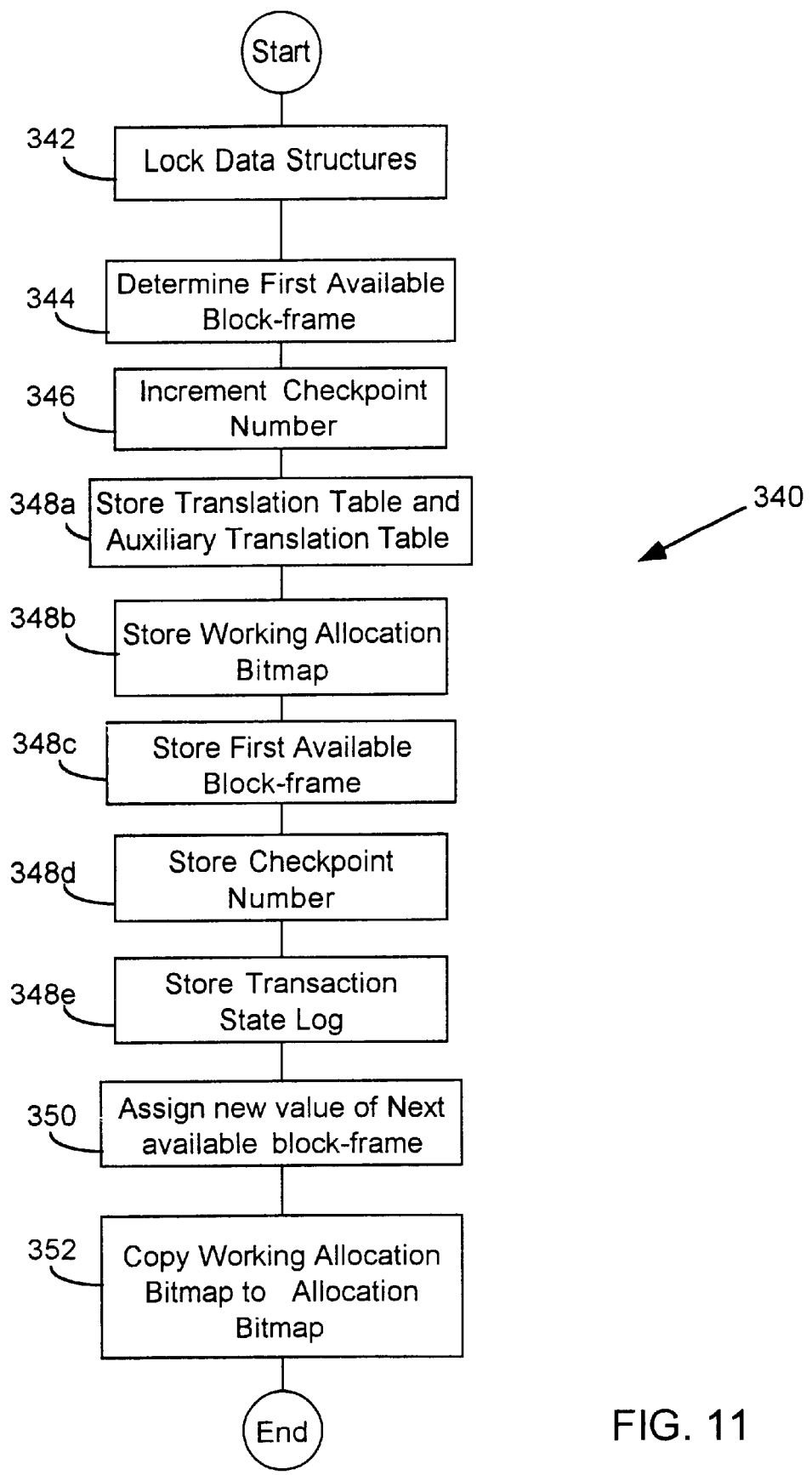
FIG. 11 is a flowchart showing steps involved in a checkpoint operation, according to a preferred embodiment of the present invention.

FIG. 11 is a flowchart showing steps involved in a checkpoint operation 340, according to a preferred embodiment of the present invention. While the following description of operation 340 applies specifically to TSLD 28 (FIG. 2), all TSLDs in system 20 or system 40 follow substantially the same steps described hereinbelow in performing respective checkpoint operations. Checkpoint operation 340 writes values held in TSLD interface 35 in volatile memory 70 to disk 62, wherein the values are permanently stored. Most preferably, checkpoint operation 340 writes to a block-frame 82e on disk 62 pre-allocated for the operation. Further most preferably, checkpoint data are not written to the same space within block-frame 82e, but are written in an alternating manner, so that previous checkpoint data are not immediately written over or erased. Checkpoint operation 340 copies structures from TSLD interface 35 to disk 62 at periodic intervals, so that in the event of a failure, TSLD 28 can recover quickly. Checkpoint operation 340 may be performed by TSLD 28 at any time, and must be performed when no block-frame is available beyond next-available-block-frame 88.

In an initial step 342 all data structures in TSLD interface 35 are locked, so that TSLD 28 ceases to support operations other than the checkpoint operation. In a second step 344, checkpoint operation 340 reads the value of first-available-block-frame 86 from interface 35. Block-frame 86 is the block-frame, as determined from working allocation bitmap 174, which is free and which is associated with the lowest disk sector address. In an increment step 346, the value of checkpoint-number 84 is incremented, and the incremented value is read.

In store steps 348a, 348b, 348c, 348d, and 348e operation 340 writes translation table 72, auxiliary translation table 172, working allocation bitmap 174, first-available-block-frame 86, incremented checkpoint-number 84, and transaction state log 90 to block-frame 32e.

In a first reassignment step 350, the value of next-available-block-frame 88 is assigned to be the value of first-available-block-frame 86, as found in step 344, which next-available-block-frame is used for a subsequent move-forward-and-store operation. In a second reassignment step 352, allocation bitmap 74 is assigned the values of working allocation bitmap 174. Operation 340 then unlocks the locked data structures in TSLD interface 35 and terminates, whereupon TSLD 28 resumes operations using the updated data structures.

While checkpoint operation 340 is running on a specific TSLD, the TSLD ceases other operations. In order to reduce effects on a system user, operation 340 may be performed in small time segments. In the above-mentioned provisional patent application and in the above-mentioned patent application entitled "Enhanced Stable Disk Storage" a description is given of a checkpoint operation substantially similar to operation 340. In addition, a detailed explanation of a method for running the checkpoint operation in small time segments, so as to reduce effects on a system user, is given. Those skilled in the art will be able to adapt the method given in the patent application entitled "Enhanced Stable Disk Storage" so as to perform operation 340 in small time segments.

Figure 12:
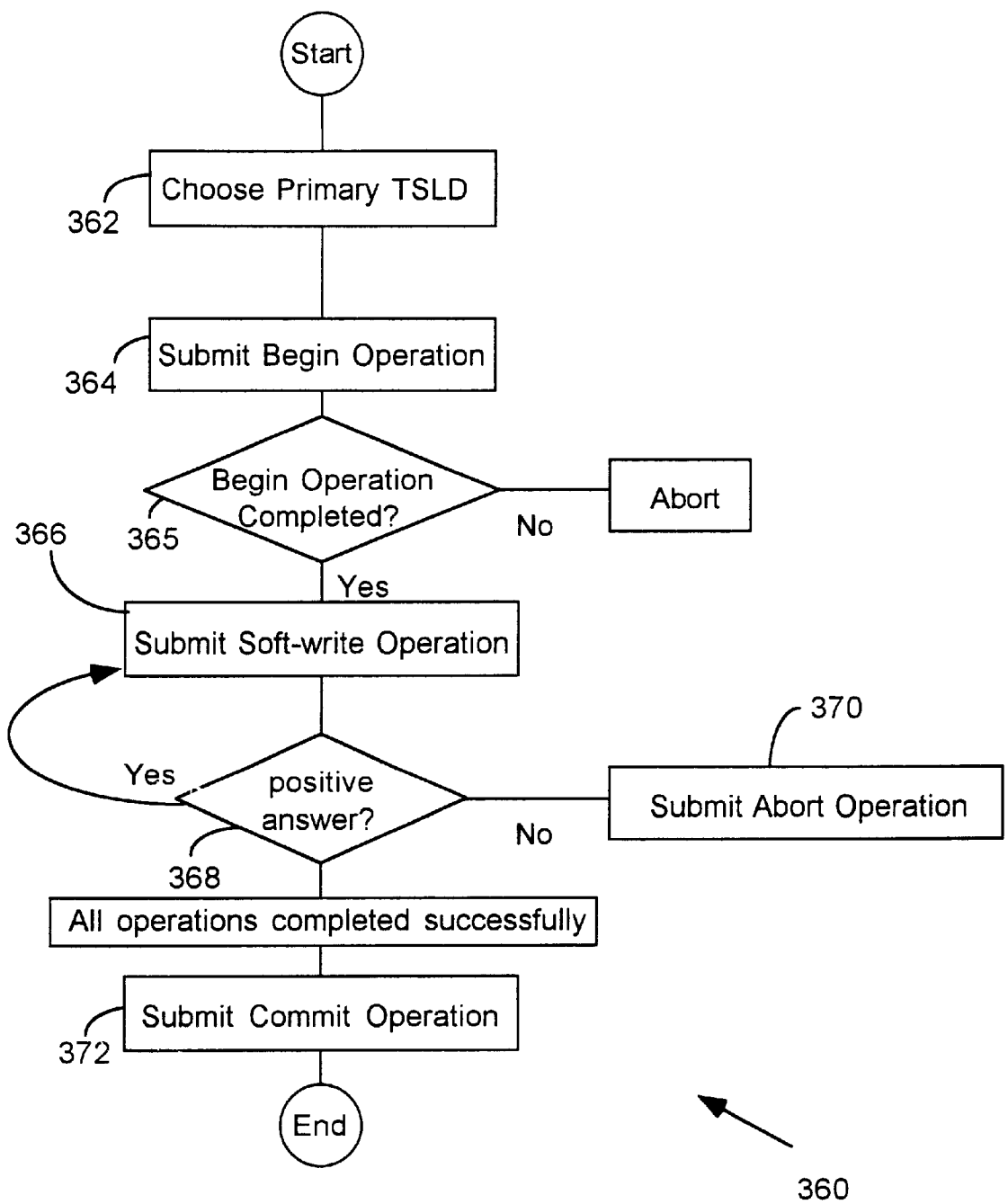
FIG. 12 is a flowchart showing steps involved in a coordination operation for a transaction, according to a preferred embodiment of the present invention.

FIG. 12 is a flowchart showing steps involved in a coordination operation 360 for transaction Tid, according to a preferred embodiment of the present invention. The transaction is herein assumed to be initiated by client 22 acting as a transaction coordinator, and TSLDs participating in the transaction are assumed to be $TSLD_1, TSLD_2, \ldots, TSLD_m$.

In an initial step 362, client 22 chooses one of the participating TSLDs to act as the primary TSLD for transaction Tid. The choice may be made by choosing the TSLD with the lowest identifier, or the TSLD which is least active, or arbitrarily. Herein $TSLD_1$ is assumed to be the primary TSLD (primTSLD).

In a begin transaction step 364, client 22 submits begin operation 260 (FIG. 7), Begin(Tid; primTSLD, $TSLD_2$, $TSLD_3, \ldots TSLD_m$), to $TSLD_1$ and in a first wait step 365 waits for a predetermined time period for an acknowledgment from $TSLD_1$ that the begin operation has completed successfully. If there is no acknowledgment, client 22 submits abort operation 300, Abort(Tid; primTSLD, $TSLD_2$, $TSLD_3, \ldots TSLD_m$), to $TSLD_1$ and aborts the transaction.

If client 22 receives an acknowledgment that begin operation 260 has completed successfully, in a soft-write step 366 client 22 submits one or more soft-write operations 220 (FIG. 4), Soft-Write(Tid, primTSLD, i, contents), to each of the participating TSLDs. Client 22 provides the following data to each participating TSLD: transaction identity Tid, primary TSLD identity ($TSLD_1$), relevant logical block address, and the relevant data block contents to be stored.

In a second wait step 368, client 22 waits a predetermined time period to receive a positive acknowledgment from each of the participating TSLDs that each soft-write operation has successfully completed. This continues for each soft-write operation.

If positive acknowledgments are not received from all participating TSLDs within the predetermined time period, in an abort step 370 client 22 submits abort operation 300, Abort(Tid; primTSLD, $TSLD_2$, $TSLD_3$, . . . $TSLD_m$), to each of the participating TSLDs. If the primary TSLD fails to acknowledge that operation 300 has completed successfully, client 22 submits a sticky-abort operation (explained hereinbelow), StickyAbort(Tid; primTSLD, $TSLD_2$, $TSLD_3$, . . . $TSLD_m$), to each of the participating non-primary TSLDs in turn, waiting after each submission for an acknowledgement of completion. Once an acknowledgment is received, or if all participating TSLDs have been queried and none have responded, coordination operation 360 terminates.

If positive acknowledgments are received from all participating TSLDs within the predetermined time period, in a commit step 372 client 22 submits commit operation 280, Commit(Tid; primTSLD, $TSLD_2$, $TSLD_3$, . . . $TSLD_m$), to the primary TSLD of the transaction. If the primary TSLD acknowledges the commit operation, the operation is then sent to each of the participating TSLDs. If the primary TSLD fails to acknowledge that operation 280 has completed successfully, client 22 submits a sticky-commit operation (explained hereinbelow), Stickycommit(Tid; primTSLD, $TSLD_2$, $TSLD_3$, . . . $TSLD_m$), to each of the participating non-primary TSLDs in turn, waiting after each submission for an acknowledgement of completion. Once an acknowledgment is received, or if all participating TSLDs have been queried and none have responded, coordination operation 360 terminates.

A sticky-commit operation is substantially the same as a commit operation and a corresponding sticky-commit record is substantially the same as a commit record. The sticky-commit operation and record apply to non-primary TSLDs. As a result of a sticky-commit operation, a sticky-commit record is added to the transaction state log of a non-primary TSLD. A sticky-commit record cannot be removed from the transaction state log of a non-primary TSLD unless explicitly instructed by a client. The above description also applies for the relationship between a sticky-abort operation and an abort operation, and between a sticky-abort record and an abort record.

It will be appreciated that coordination operation 360 attempts to either, commit or abort transaction Tid, and to record on at least one of the participating TSLDs of the transaction the result of the operation.

Figure 13:
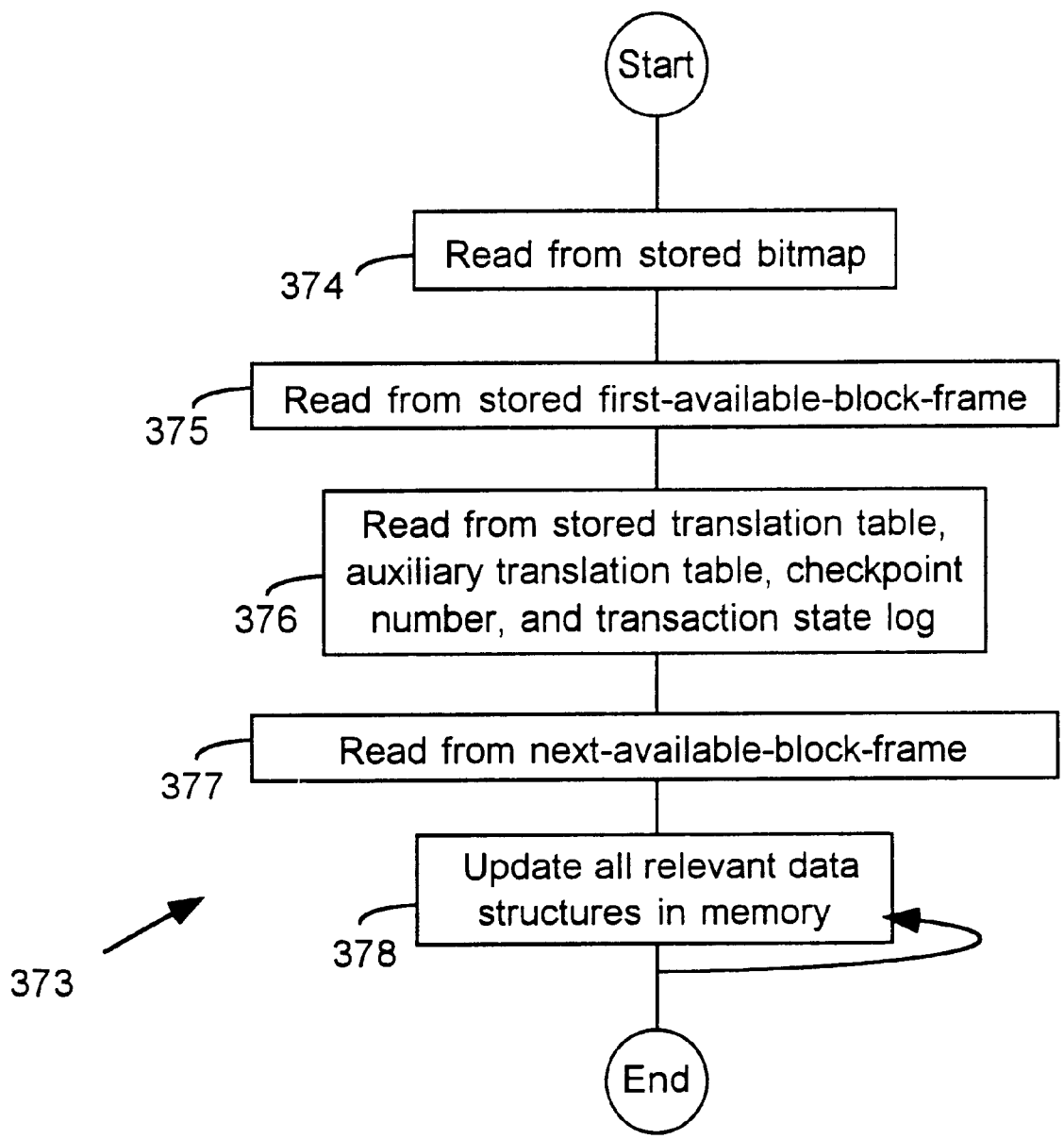
FIG. 13 is a flowchart showing steps involved in a first recovery operation, according to a preferred embodiment of the present invention.

FIG. 13 is a flowchart showing steps involved in a first recovery operation 373, according to a preferred embodiment of the present invention. Operation 373 is performed after recovery from a storage server failure such as server 26 in system 20 or system 40. As described in detail below, operation 373 requires scanning of allocation bitmap 74. (The above-mentioned patent application entitled "Enhanced Stable Disk Storage" gives a detailed description of an alternative method of recovery from failure for a non-volatile disk memory, and those skilled in the art will be able to apply the description to recovery of a server such as server 26 from a system failure. The alternative method takes time which is a linear function of the number of blocks written since the last checkpoint.)

In a first read step 374, values of allocation bitmap 74 which have been stored in last checkpoint operation 340 to disk 62 are read back into allocation bitmap 74 and working allocation bitmap 174, in TSLD interface 35.

In a second read step 375, the value of first-available-block-frame 86 which was stored in last checkpoint operation 340 to disk 62 is read back into first-available-block-frame 86 and next-available-block-frame 88.

In a third read step 376, the values in translation table 72, auxiliary translation table 172, checkpoint number 84, and transaction state log 90, which were stored in the last checkpoint operation 340 are read back into the respective data structures in TSLD interface 35.

In a fourth read step 377, the block stored at the block-frame address given by next-available-block-frame 88 is read.

In an update step 378, while checking that checkpoint number 84 in TSLD interface 35 corresponds to the stored checkpoint number for each block read,
   a. Update all relevant data structures in TSLD interface 35 according to the last block read (initially from step 377). I.e., replay the TSLD operations that occurred while the block-frame was stored.
   b. Locate the next block-frame that was stored to, by looking forward in allocation bitmap 74 for the first bit marking an available block-frame, and read the block in that block-frame.
   c. Continue with steps 378a and 378b, ignoring any blocks that cannot be read due to faulty sectors 64, until allocation bitmap 74 has been completely scanned in a forward direction.

Operation 373 then terminates.

It will be appreciated that first recovery operation 373 substantially completely returns data structures within TSLD interface 35 to their values before failure, apart from localized errors caused by blocks that cannot be read, by a process of "replaying" TSLD operations performed since the last checkpoint operation. The process of replaying is accomplished by reading one or more parameters from the last checkpoint operation written to disk 62 so as to establish block-frame locations written to since the operation.

Figure 14:
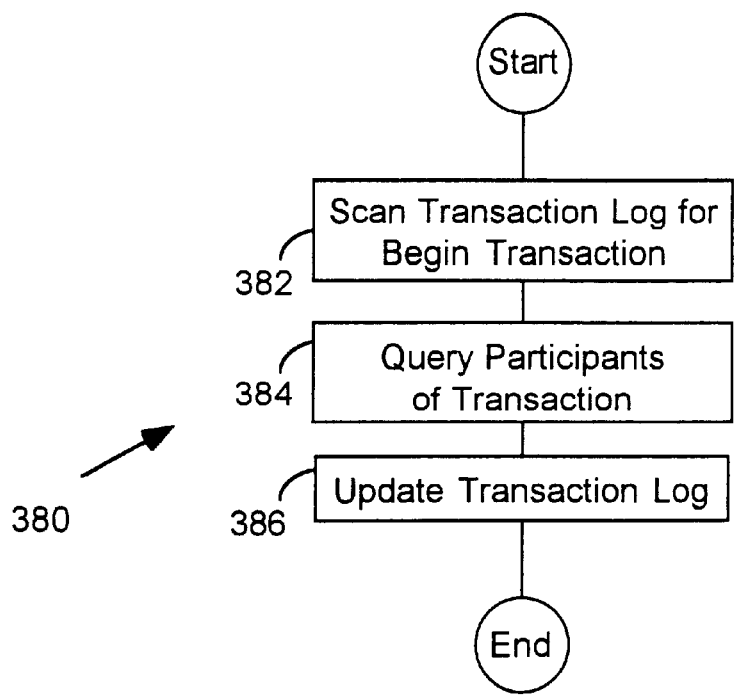
FIG. 14 is a flowchart showing steps involved in a second recovery operation, according to a preferred embodiment of the present invention.

FIG. 14 is a flow chart showing steps involved in a second recovery operation 380, according to a preferred embodiment of the present invention. Operation 380 is most preferably performed after operation 373 has concluded on a recovered server, herein assumed to be server 26, in order to determine the status of open transactions.

In a first step 382 of recovery operation 380, server 26 scans its transaction state log 90 for begin transaction records, indicating open transactions where TSLD 28 is the primary TSLD. For each such transaction, in a query step 384, TSLD 28 checks with each of the participating TSLDs of the transaction for a commit or abort record. In an update step 386 TSLD 28 updates its transaction log 90 according to the results of step 384. First recovery operation 380 then terminates. It will be appreciated that by performing operation 380, TSLD 28 is then in a state so that it can respond with up-to-date information to queries from other TSLDs involved in transactions for which TSLD 28 is the primary TSLD.

Figure 15:
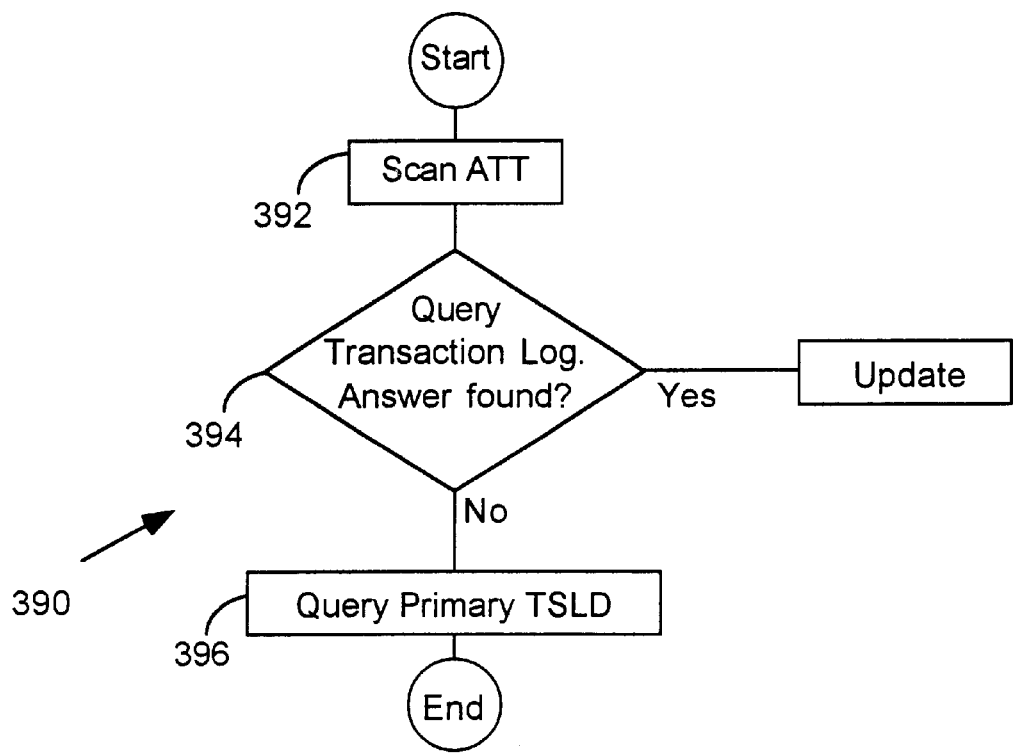
FIG. 15 is a flowchart showing steps involved in a third recovery operation, according to a preferred embodiment of the present invention.

FIG. 15 is a flowchart showing steps involved in a third recovery operation 390, according to a preferred embodiment of the present invention. As for recovery operation 380, recovery operation 390 is performed by server 26, most preferably after performing operation 380, after it has recovered from a failure. In a first step 392 server 26 scans its auxiliary translation table 172, which has been reconstructed as described above, to find transactions which appear to be open. For each such transaction, server 26 follows the steps hereinbelow. In a query step 394, server 26 locates the soft-written block corresponding to the specific transaction and queries its transaction log 90 to find the state of the transaction. If transaction log 90 provides the state of the transaction, server 26 updates data structures in memory 70 as required, and continues to the next open transaction.

If transaction log 90 cannot provide the state of the transaction, in a second query step 396 the primary TSLD of the transaction, as specified in trailer field 214 of the block-frame of the transaction, is queried. Server 26 incorporates, the results of the query to the primary TSLD into the data structures of TSLD interface 35. Operation 390 terminates after all open transactions found in step 392 have been processed through step 394 and/or step 396.

FIG. 16 is a flowchart showing steps involved in a transaction completion operation 400 performed by a client, according to a preferred embodiment of the present invention. Typically this occurs as a result of failure of a client while executing a transaction. Operation 400 is most preferably performed by a client in system 20 or system 40 when the client receives an open-transaction-error return when attempting to read a specific block-frame in a specific TSLD. (As described above, for example, in check step 222 of soft-write operation 220.) Herein the client is assumed to be client 22, and the block-frame is assumed to be block-frame 64a in TSLD 28. The open-transaction-error indicates that block-frame 64a is engaged in an open transaction. Operation 400 enables participants to an open transaction to establish consensus whether to commit or abort the transaction, and so complete the transaction.

In a first step 402, client 22 performs soft-read operation 240 (FIG. 5), Soft-Read(i), on block-frame 64a, and receives transaction identity Tid and the identity of the primary TSLD. In a first query step 404, client 22 performs query operation 320 (FIG. 10A), Query_State (Tid), on the primary TSLD, and acts according to the response received.

If there is no response, client 22 cannot complete the transaction since the primary TSLD is not functioning. In this case, in a wait step 406 client 22 waits for the primary TSLD to be transferred to a functioning server.

If, in a first response step 408, the primary TSLD responds with an "unknown" statement, client 22 performs commit operation 280, Commit(Tid; primTSLD, $TSLD_2$, $TSLD_3$, . . . $TSLD_m$), on the specific TSLD from where it received the open-transaction-error signal, in this case TSLD 28.

If, in a second response step 410, the primary TSLD responds with an "open" statement, together with a list of other TSLDs participating in the transaction, in a second query step 412 client 22 performs query operation 320 on each of the participating TSLDs in turn.

If a definite response, i.e., a "committed" or an "aborted" reply, is received from any of the participating TSLDs, in a third response step 414 client 22 performs respective commit operation 280 or abort operation 300, Abort(Tid; primTSLD, $TSLD_2$, $TSLD_3$, . . . $TSLD_m$), on the remaining participating TSLDs.

If, in second response step 412, all of the participating TSLDs return an "open" reply, in a fourth response step 416 client 22 again tries to read the initial block frame, i.e., block-frame 64a, in case there has been a change since the start of operation 400. If there has been no change, client 22 performs abort operation 300 on the participating TSLDs.

If, in second response step 412 one of the participating TSLDs does not respond, in fifth response step 418 client 22 waits for a response from the particular TSLD, since it may be that the particular non-responsive TSLD has the required answer. After step 406, 408, 414, 416, or 418, operation 400 terminates.

It will be appreciated that at all times that TSLD 28 is accessible, a specific block-frame 82 of TSLD 28 will either not be engaged in a transaction, or will be engaged so that translation table 72 will mark the engagement. The same applies for other accessible TSLDs and their respective translation tables in system 20 or system 40. Thus, in transaction completion operation 400, client 22 may be able to read the block contents of a block-frame on one TSLD, and the block contents of a block-frame on another TSLD, so that system 20 or system 40 appears inconsistent. Even in this case, however, client 22 is well aware of the status of the system and is able to reach a conclusion as to the state of any incomplete transaction.

In order to minimize the size of the transaction state log 90, records need to be removed from the log when they are no longer required. As described hereinabove, in a primary TSLD each begin transaction record is replaced by a commit record or an abort record. After a predetermined time interval commit records on a primary TSLD can be removed, since they are not required. (As described above, if a transaction is known to be open on a non-primary TSLD, and the primary TSLD responds when queried with "unknown," the transaction is assumed to have committed.) Abort records on a primary TSLD can be removed once the primary TSLD has ascertained that all participating TSLDs of the relevant transaction are aware of the state of the transaction.

A non-primary TSLD is able to remove a commit or abort record of a specific transaction once the primary TSLD for the transaction has queried the non-primary TSLD regarding the transaction, since on making the query the primary TSLD records the transaction state. Most preferably, therefore, TSLDs within a system coordinate as described hereinabove in order to remove unnecessary transaction records from transaction state log 90.

It will be appreciated that while system 20 and system 40 utilize a plurality of TSLDs and a plurality of servers managing the TSLDs, the principles of the present invention apply to one server managing one TSLD. Furthermore, it will be appreciated that the principles of the present invention apply to recovery and completion of a plurality of concurrent data transactions when these transactions are performed on one or more TSLDs, since the plurality of transactions are logged and recovered substantially independently of each other.

It will also be appreciated that the scope of the present invention includes methods other than those described above for recovering data from a succession of data blocks after failure of a server, wherein one or more parameters indicative of the location of a subsequent data block are written to a storage device. Examples of such methods are described in provisional patent application 60/176507 and the patent application entitled "Enhanced Stable Disk Storage."

It will be further appreciated that preferred embodiments of the present invention may be provided as a computer software product. Such a product may be provided as an electronic data transmission or in a tangible form on a computer-readable medium such as a CD-ROM, or as a mixture of both forms.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Apparatus for supporting a data transaction, comprising:

at least one storage device which is adapted to receive data as a succession of data blocks, comprising one or more data structures comprising one or more values indicative of respective properties of at least some of the data blocks, for storage at respective physical locations therein; and control circuitry, which is configured to convey the succession of data blocks to the at least one storage device while writing to the at least one storage device, together with at least some of the data blocks, at least one parameter indicative of a physical location of a subsequent data block in the succession, and, in response to the at least one parameter, to alter at least one of the one or more values so as to complete the data transaction.

2. Apparatus according to claim 1, wherein the control circuitry comprises at least one communication link which couples the control circuitry to the at least one storage device, and wherein the control circuitry manages the at least one storage device via the at least one communication link.

3. Apparatus according to claim 1, further comprising a data transmission network which conveys the data to the control circuitry and which is coupled thereto.

4. Apparatus according to claim 3, wherein the data transmission network is coupled to and conveys the data to the at least one storage device, and wherein the control circuitry manages the at least one storage device via the data transmission network.

5. Apparatus according to claim 1, further comprising a client which conveys the data to the control circuitry.

6. Apparatus according to claim 1, further comprising a disk controller which controls the at least one storage device, wherein the disk controller is able to recover contents of a volatile memory from data written by the control circuitry to the at least one storage device.

7. Apparatus according to claim 1, wherein the at least one parameter comprises a plurality of parameters.

8. Apparatus according to claim 1, wherein the at least one storage device comprises a disk managed by a server.

9. Apparatus according to claim 1, wherein the at least one storage device comprises a plurality of storage devices.

10. Apparatus according to claim 1, wherein the at least one storage device is adapted to be movable so as to be operative by other control circuitry, in order to recover information stored on the at least one storage device.

11. Apparatus according to claim 1, wherein the at least one storage device comprises a non-volatile storage device.

12. Apparatus for supporting a data transaction, comprising:

at least one storage device which is adapted to receive data as a succession of data blocks, comprising one or more data structures comprising one or more values indicative of respective properties of at least some of the data blocks, for storage at respective physical locations therein; and control circuitry, which is configured to convey the succession of data blocks to the at least one storage device while writing to the at least one storage device, together with at least some of the data blocks, at least one parameter indicative of a physical location of a subsequent data block in the succession, and, in response to the at least one parameter, to alter at least one of the one or more values so as to complete the data transaction, wherein the control circuitry comprises at least one volatile memory which is adapted to store the one or more data structures, at least some of which data structures are written by the control circuitry to the at least one storage device, so that the contents of the at least one volatile memory can be regenerated from the at least some of the data structures written to the at least one storage device.

13. Apparatus according to claim 12, wherein one of the one or more data structures comprises a translation table which maps logical block addresses of the succession of data blocks to respective physical addresses and which tags which of the data blocks is currently engaged in an open data transaction.

14. Apparatus according to claim 13, wherein one of the one or more data structures comprises an auxiliary translation table which for each respective open data transaction maps logical block addresses associated with an open transaction to respective physical addresses of the succession of data blocks existing prior to initiation of the data transaction and to an identity of the open data transaction.

15. Apparatus according to claim 13, wherein the control circuitry writes the respective logical block addresses to the succession of data blocks.

16. Apparatus according to claim 13, wherein the control circuitry writes an identity of a data transaction to the succession of data blocks.

17. Apparatus according to claim 13, wherein the control circuitry writes an identity of a recorder of a state of a data transaction to the succession of data blocks.

18. Apparatus according to claim 12, wherein one of the one or more data structures comprises an allocation bitmap which maps an availability of each of the succession of data blocks.

19. Apparatus according to claim 12, wherein one of the one or more data structures comprises a pointer value to the location of a next available data block in the succession.

20. Apparatus according to claim 12, wherein one of the one or more data structures comprises a pointer value to the location of a first available block in the succession.

21. Apparatus according to claim 12, wherein the at least one storage device comprises a disk having a disk head, and wherein the control circuitry writes the data blocks to the disk in a series of passes of the disk head over a surface of the disk in a single direction.

22. Apparatus according to claim 21, wherein each of the series of passes has a checkpoint-number, and wherein one of the data structures comprises a value indicative of the current checkpoint-number.

23. Apparatus according to claim 21, wherein one of the one or more data structures comprises a working allocation bitmap which stores an availability of each of the successive data blocks at the conclusion of one or more passes of the disk head.

24. Apparatus according to claim 21, wherein the control circuitry writes the at least some of the one or more data structures to the at least one storage device at the conclusion of one or more of the passes of the disk head.

25. Apparatus according to claim 12, wherein one of the one or more data structures comprises a transaction state log which is adapted to store at least one record of the data transaction, wherein the at least one record comprises an identity of the data transaction and an identity of the at least one storage device participating in the data transaction, and wherein the at least one record comprises at least one of a group of records consisting of: begin-transaction, commit-transaction, and abort-transaction, which respectively record that the transaction has begun, is committed, and is aborted.

26. Apparatus for supporting a data transaction, comprising:

at least one storage device which is adapted to receive data as a succession of data blocks, comprising one or more data structures comprising one or more values indicative of respective properties of at least some of the data blocks, for storage at respective physical locations therein; and control circuitry, which is configured to convey the succession of data blocks to the at least one storage device while writing to the at least one storage device, together with at least some of the data blocks, at least one parameter indicative of a physical location of a subsequent data block in the succession, and, in response to the at least one parameter, to alter at least one of the one or more values so as to complete the data transaction, wherein the control circuitry writes a trailer to the succession of data blocks, the trailer comprising one or more data fields indicative of a use of each of the data blocks.

27. Apparatus according to claim 26, wherein the one or more data fields comprise an identity of the data transaction and an identity of a recorder of the data transaction, wherein the recorder of the data transaction comprises one of the at least one storage devices.

28. Apparatus according to claim 26, wherein the one or more data fields comprise a logical address of the data block.

29. Apparatus according to claim 26, wherein the one or more data fields comprise a tag indicative of a state of the data transaction.

30. Apparatus for supporting data transactions, comprising:

at least one storage device which is adapted to receive data as a succession of data blocks, comprising one or more data structures comprising one or more values indicative of respective properties of at least some of the data blocks, for storage at respective physical locations therein; and control circuitry, which is configured to convey the succession of data blocks to the at least one storage device while writing to the at least one storage device, together with at least some of the data blocks, at least one parameter indicative of a physical location of a subsequent data block in the succession, and, in response to the at least one parameter, to alter at least one of the one or more values so as to complete the data transactions, wherein the data transactions comprise a plurality of concurrent data transactions.

31. Apparatus for supporting a data transaction, comprising:

at least one storage device which is adapted to receive data as a succession of data blocks, comprising one or more data structures comprising one or more values indicative of respective properties of at least some of the data blocks, for storage at respective physical locations therein; and control circuitry, which is configured to convey the succession of data blocks to the at least one storage device while writing; to the at least one storage device, together with at least some of the data blocks, at least one parameter indicative of a physical location of a subsequent data block in the succession, and, in response to the at least one parameter, to alter at least one of the one or more values so as to complete the data transaction, wherein the at least one parameter comprises a transaction state log which records one or more states of the data transaction.

32. Apparatus for supporting a data transaction, comprising:

at least one storage device which is adapted to receive data as a succession of data blocks, comprising one or more data structures comprising one or more values indicative of respective properties of at least some of the data blocks, for storage at respective physical locations therein; and control circuitry, which is configured to convey the succession of data blocks to the at least one storage device while writing to the at least one storage device, together with at least some of the data blocks, at least one parameter indicative of a physical location of a subsequent data block in the succession, and, in response to the at least one parameter, to alter at least one of the one or more values so as to complete the data transaction, wherein the at least one parameter comprises at least a part of a distributed transaction state log which records one or more states of the data transaction.

33. A method for performing a data transaction, comprising:

receiving data in at least one storage device as a succession of data blocks, comprising one or more data structures comprising one or more values indicative of respective properties of at least some of the data blocks, and, together with each of at least some of the data blocks, at least one parameter indicative of a physical location of a subsequent data block in the succession; and altering at least one of the one or more values in the at least one storage device, responsive to the at least one parameter, so as to complete the data transaction.

34. A method according to claim 33, wherein the at least one parameter comprises a plurality of parameters.

35. A method according to claim 33, wherein receiving data in the at least one storage device comprises conveying the data to the at least one storage device via a data transmission network.

36. A method according to claim 35, wherein conveying the data comprises coupling the at least one storage device to the data transmission network.

37. A method according to claim 35, wherein conveying the data comprises:

coupling the at least one storage device to the data transmission network via control circuitry; and coupling the control circuitry to the data transmission network.

38. A method according to claim 33, wherein receiving the data comprises receiving data from a client.

39. A method according to claim 33, wherein the at least one storage device comprises a disk managed by a server.

40. A method according to claim 33, wherein the at least one storage device comprises a plurality of storage devices.

41. A method according to claim 33, wherein the at least one storage device comprises a non-volatile storage device.

42. A method for performing a data transaction, comprising:

receiving data in at least one storage device as a succession of data blocks, comprising one or more data structures comprising one or more values indicative of respective properties of at least some of the data blocks, and, together with each of at least some of the data blocks, at least one parameter indicative of a physical location of a subsequent data block in the succession; and altering at least one of the one or more values in the at least one storage device, responsive to the at least one parameter, so as to complete the data transaction, further comprising storing in at least one volatile memory the one or more data structures, and writing at least some of the data that are in the data structures to the at least one storage device, so that the contents of the at least one volatile memory can be regenerated from the at least some of the data in the one or more data structures written to the at least one storage device.

43. A method according to claim 42, wherein storing the one or more data structures comprises storing a translation table which maps logical block addresses of the succession of data blocks to respective physical addresses and which tags which of the data blocks is currently engaged in an open data transaction.

44. A method according to claim 43, wherein storing the one or more data structures comprises storing an auxiliary translation table which for each respective open data transaction maps logical block addresses associated with an open transaction to respective physical addresses of the succession of data blocks existing prior to initiation of the data transaction and to an identity of the open data transaction.

45. A method according to claim 43, wherein receiving the data comprises writing the respective logical addresses to the succession of data blocks.

46. A method according to claim 43, and comprising using the translation table to locate a specific data block, so as to read data from the specific data block.

47. A method according to claim 42, wherein storing the one or more data structures comprises storing an allocation bitmap which indicates an availability of each of the succession of data blocks.

48. A method according to claim 42, wherein writing the at least some of the data to the at least one storage device comprises writing data to one of the succession of data blocks using the steps of:
scanning the one or more data structures to determine the physical location of an available data block in the at least one storage device;
writing the data and at least some contents of the one or more data structures into the physical location; and
updating the one or more data structures responsive to the determined physical location.

49. A method according to claim 48, wherein scanning the one or more data structures comprises checking if a logical block address is involved in an open transaction.

50. A method according to claim 48, wherein writing the data and at least some contents of the one or more data structures comprises the steps of:
writing a value corresponding to a soft-write operation; and
writing an identity of one of the at least one storage device as a recorder of a transaction state, so as to perform a temporary write operation.

51. A method according to claim 48, wherein writing the data and at least some contents of the one or more data structures comprises writing a value corresponding to a begin operation, and wherein updating the one or more data structures comprises writing a begin record including an identity of the transaction and an identity of the at least one storage device, so as to perform the begin operation.

52. A method according to claim 48, wherein writing the data and at least some contents of the one or more data structures comprises writing a value corresponding to a commit operation, and wherein updating the one or more data structures comprises:
removing a tag indicative of an open state of the transaction;
writing a commit record including an identity of the transaction and an identity of the at least one storage device, so as to perform the commit operation; and
updating a transaction state log.

53. A method according to claim 48, wherein writing the data and at least some contents of the one or more data structures comprises writing a value corresponding to an abort operation, and wherein updating the one or more data structures comprises:
removing a tag indicative of an open state of the transaction;
writing an abort record including an identity of the transaction and an identity of the at least one storage device, so as to perform the abort operation; and
updating a transaction state log.

54. A method according to claim 42, and comprising scanning the one or more data structures to determine a state of the data transaction.

55. A method according to claim 42, and comprising performing a checkpoint operation comprising the steps of:
locking the one or more data structures;
writing the contents of the one or more data structures to a checkpoint location in the at least one storage device; and
altering at least some of the contents of the one or more data structures responsive to writing the contents to the at least one storage device.

56. A method according to claim 55, and comprising performing, a recovery operation comprising the steps of:
reading the contents of the one or more data structures from the at least one storage device; and
updating the one or more data structures in the at least one volatile memory responsive to the contents.

57. A method according to claim 56, wherein performing the recovery operation comprises reading the contents of all of the one or more data structures written to since performing the checkpoint operation.

58. A method according to claim 56, wherein performing the recovery operation comprises reading the contents of all of the one or more data structures written to since performing the checkpoint operation in a time not substantially greater than the time taken to write all of the one or more data structures written to since performing the checkpoint operation.

59. A method according to claim 56, wherein performing the recovery operation comprises determining a state of an open transaction and enabling one or more clients of the open transaction to query the state and decide whether to commit or abort the open transaction.

60. A method according to claim 42, and comprising performing a transaction coordination operation comprising the steps of:
choosing one of the at least one storage devices to be a recorder of a state of the data transaction;
submitting a begin transaction operation to the recorder;
waiting for a predetermined time for a response, indicative of the state of the data transaction, from the at least one storage device;
conditional on the response, submitting one or more soft-write operations to the at least one storage device; and
conditional on the response, deciding whether to commit or abort the transaction, by issuing a commit or abort transaction operation.

61. A method according to claim 42, and comprising performing a transaction completion operation comprising the steps of:

reading a first set of the succession of data blocks from the at least one storage device containing contents indicative of a state of the data transaction; and responsive to the contents of the first set of the succession of data blocks, writing a second set of the succession of data blocks to the at least one storage device and storing a set of the one or more data structures to the at least one volatile memory.

62. A method for performing data transactions, comprising:

receiving data in at least one storage device as a succession of data blocks, comprising one or more data structures comprising one or more values indicative of respective properties of at least some of the data blocks, and, together with each of at least some of the data blocks, at least one parameter indicative of a physical location of a subsequent data block in the succession; and altering at least one of the one or more values in the at least one storage device, responsive to the at least one parameter, so as to complete the data transactions, wherein the data transactions comprise a plurality of concurrent data transactions.

63. Apparatus for electronic data storage, comprising:

a non-volatile storage device, adapted to receive a succession of data blocks for storage at respective physical locations therein; and control circuitry, which is configured to convey the succession of data blocks to the non-volatile storage device while writing to the non-volatile storage device, together with at least some of the data blocks, one or more parameters indicative of the physical location of a subsequent data block in the succession.

64. Apparatus according to claim 63, wherein the one or more parameters comprise a plurality of parameters.

65. A method for electronic data storage, comprising:

providing a succession of data blocks for storage at respective physical locations in a non-volatile storage device;

determining for each of at least some of the data blocks in the succession one or more parameters indicative of the physical location of a subsequent data block in the succession; and storing the succession of the data blocks and the one or more parameters in the non-volatile storage device.

66. A method according to claim 65, wherein the one or more parameters comprise a plurality of parameters.

67. A computer software product for performing a data transaction, comprising a computer-readable medium having program instructions recorded therein, which instructions, when read by a computer, cause the computer to receive data in at least one storage device as a succession of data blocks, comprising one or more data structures comprising one or more values indicative of respective properties of at least some of the data blocks, and, together with each of at least some of the data blocks, at least one parameter indicative of a physical location of a subsequent data block in the succession, and to alter at least one of the one or more values in the at least one storage device, responsive to the at least one parameter, so as to complete the data transaction.

68. A computer software product for electronic data storage, comprising a computer-readable medium having program instructions recorded therein, which instructions, when read by a computer, cause the computer to provide a succession of data blocks for storage at respective physical locations in a non-volatile storage device, to determine for each of at least some of the data blocks in the succession one or more parameters indicative of the physical location of a subsequent data block in the succession, and to store the succession of the data blocks and the one or more parameters in the non-volatile storage device.

* * * * *